US008028572B2

(12) United States Patent
Matsuda et al.

(10) Patent No.: US 8,028,572 B2
(45) Date of Patent: Oct. 4, 2011

(54) OMNIDIRECTIONAL RAIN GAUGE

(75) Inventors: Masuyoshi Matsuda, Tokyo (JP); Makoto Shimamura, Tokyo (JP); Osamu Suzuki, Tokyo (JP); Shigeru Kishi, Tokyo (JP)

(73) Assignees: MTS Institute Inc., Tokyo (JP); East Japan Railway Company, Tokyo (JP)

( * ) Notice: Subject to any disclaimer, the term of this patent is extended or adjusted under 35 U.S.C. 154(b) by 0 days.

(21) Appl. No.: 12/793,939

(22) Filed: Jun. 4, 2010

(65) Prior Publication Data

US 2010/0300198 A1 Dec. 2, 2010

Related U.S. Application Data

(63) Continuation of application No. PCT/JP2008/003623, filed on Dec. 5, 2008.

(30) Foreign Application Priority Data

Dec. 5, 2007 (JP) ................................. 2007-314954
Dec. 1, 2008 (JP) ................................. 2008-306685

(51) Int. Cl.
*G01W 1/00* (2006.01)
(52) U.S. Cl. .................................. 73/170.17; 73/170.21
(58) Field of Classification Search ......................... None
See application file for complete search history.

(56) References Cited

U.S. PATENT DOCUMENTS

| | | | | |
|---|---|---|---|---|
| 3,309,710 | A * | 3/1967 | Smoot et al. | 346/49 |
| 4,613,938 | A * | 9/1986 | Hansen et al. | 702/3 |
| 5,505,082 | A * | 4/1996 | Cushman et al. | 73/170.21 |
| 7,152,468 | B1 * | 12/2006 | Peterson | 73/170.17 |
| 2008/0184788 | A1 * | 8/2008 | Jeong et al. | 73/170.21 |

FOREIGN PATENT DOCUMENTS

| | | |
|---|---|---|
| JP | 5-009576 | 2/1993 |
| JP | 2003-21689 | 1/2003 |
| JP | 2006-17462 | 1/2006 |

* cited by examiner

*Primary Examiner* — Andre J Allen
(74) *Attorney, Agent, or Firm* — Myers Wolin, LLC.

(57) ABSTRACT

An Omnidirectional rain gauge measures an azimuth and zenith direction of flying rainwater. The Omnidirectional rain gauge includes catchment and measurement units. The catchment unit has a plural conical cylinders having individually different heights, and being overlaid so that bottom vertexes of the plural conical cylinders coincide with or come close to each other. The overlaid plural conical cylinders are partitioned by partitions, arranged radially in a plurality of horizontal azimuth directions, to form a plurality of catchment cells. Each of the plurality of partitions is shaped as semi-circle following a virtual spherical outer circumference. Diameter of each of top opening parts opposite to the bottom vertexes, of the overlaid plural conical cylinders is sized to follow virtual spherical outer circumference. The measurement unit, by the rainwater caught by each of the plurality of catchment cells of the catchment unit dropping in a drop of water of a certain weight, detects the number of the dropping drops of water with respect to each of the plurality of catchment cells, and determines the amount of the rainwater caught by each of catchment cells on the basis of the total detected number of the drops of water.

16 Claims, 27 Drawing Sheets

| | CELL NUMBER | CELL CH1 | CELL CH2 | CELL CH3 | CELL CH4 | CELL CH5 | CELL CH6 | CELL CH7 | CELL CH8 | CELL CH9 | CELL CH10 | CELL CH11 | CELL CH12 | TOTAL |
|---|---|---|---|---|---|---|---|---|---|---|---|---|---|---|
| I | NUMBER OF DROPS OF WATER (DROPS/10mim) | 94 | 149 | 50 | 57 | 44 | 228 | 229 | 43 | 0 | 0 | 32 | 3 | 929 |
| II | AMOUNT OF DROPS OF WATER (g/10min) | 13.1 | 20.8 | 7.0 | 8.0 | 6.2 | 31.9 | 32.0 | 6.0 | 0.0 | 0.0 | 4.5 | 0.4 | 129.9 |
| III | SPHERICAL AREA OF THE CATCHMENT UNIT (cm2) | 46 | 46 | 46 | 46 | 111 | 111 | 111 | 111 | 111 | 111 | 111 | 111 | 1073 |
| IV | CATCH AMOUNT OF WATER PER UNIT SPERICAL AREA OF THE CELL ($g/cm^2/10min$) | 0.286 | 0.453 | 0152 | 0.173 | 0.055 | 0.287 | 0.288 | 0.054 | 0.000 | 0.000 | 0.040 | 0.004 | 1.793 |

(A)

| FOUR AZIMUTH DIRECTIONS | 0~90 | 90~180 | 180~270 | 270~360 |
| --- | --- | --- | --- | --- |
| AGGREGATED AMOUNT OF DROPS OF WATER FOR EACH AZIMUTH DIRECTION UNIT : g/10min | CELL CH1+5+9 | CELL CH2+6+10 | CELL CH3+7+11 | CELL CH4+8+12 |
| | 19.3 | 52.7 | 43.5 | 14.4 |

(B)

(A)

| ZENITH ANGLE OF SIX CELLS INCLUDING THE CROSS-SECTIONAL PLANE OF THE DISTINCTIVE DROPPING DIRECTION OF THE RAINWATER | -135~-90° | -90~-45° | -45~-0° | 0~45° | 45~90° | 90 ~ 135° |
|---|---|---|---|---|---|---|
| CATCH AMOUNT OF WATER PER UNIT SPHERICAL AREA OF THE CELL UNIT : g/10min | CELL CH12 | CELL CH8 | CELL CH4 | CELL CH2 | CELL CH6 | CELL CH10 |
| | 0.004 | 0.054 | 0.173 | 0.453 | 0.287 | 0.000 |

(B)

OMNIDIRECTIONAL RAIN GAUGE

CROSS-REFERENCE TO RELATED APPLICATIONS

This application is a continuation of international application PCT/JP2008/003623, filed on Dec. 5, 2008, now pending, herein incorporated by reference. Further, this application is based upon and claims the benefit of priority from the prior Japanese Patent Application No. 2007-314954, filed on Dec. 5, 2007, and the prior Japanese Patent Application No. 2008-306685, filed on Dec. 1, 2008 entire contents of which are incorporated herein by reference.

FIELD OF THE INVENTION

This invention relates to a rain gauge, a certain aspect of which relates to an omnidirectional rain gage which measures separately the rainwater amount incoming from each azimuth and zenith direction.

BACKGROUND ART

As a conventional rain gauge, generally a rain gauge with a tipping bucket has been widely used. FIG. 1 is a drawing for illustrating an overview of such the rain gauge with a tipping bucket.

The rain gauge with a tipping bucket is configured to have a conical funnel 1A as a catchment unit for catching the dropping rainwater, and a tipping bucket 1B which reserves a certain amount of the rainwater caught by conical funnel 1A and tips over to any direction around a pivot point.

The tipping bucket 1(B) includes catchment bucket units I and II respectively on the left and the right sides, each of which has the same specified capacity. When the catchment bucket unit I on one side reserves a specified amount of rainwater (FIG. 1(A)), the catchment bucket unit I tips over by its weight around the pivot point and drains off the reserved rainwater. Then, the tipping bucket unit II on the other side starts to reserve the rainwater (FIG. 1(B)). Further, when the specified amount of the rainwater is reserved in the other catchment bucket unit II, again the catchment bucket unit II tips over and drains off the reserved rainwater, then the condition transits to as illustrated in FIG. 1(A).

Then, every time the tipping bucket 1B tips over, a switch not illustrated is turned on. Thus, from the number of times of the switch being turned on in a specified period and the specified capacity of the catchment bucket units I and II, the total rainfall amount or the rainfall amount per unit time can be obtained.

Here, the conventional rain gauge with a tipping bucket illustrated in FIG. 1 is configured to catch the dropping rainwater by the conical funnel 1A. Therefore, in FIG. 2 for explaining problems of the rain gauge with a tipping bucket, when the rainwater drops in the perpendicular direction under a windless condition (FIG. 2(A)), rainfall amount can be measured accurately.

However, as illustrated in FIG. 2(B), when the rainwater drops in the inclined direction under a windy condition, the cylindrical outer shape causes inconsistency of the surrounding wind and the amount of the rainwater which cannot be caught by the catchment surface at the top of the cylinder increases. In such a case, an accurate measurement of the rainfall amount becomes difficult.

For example, on a steep inclined land, the rainwater comes flying in the horizontal direction by a wind blowing up, theretofore, an accurate measurement of the rainfall amount by the conventional rain gauge with a tipping bucket as illustrated in FIG. 1 is difficult.

To address such problem, improvements on the catchment unit have been proposed (examples are illustrated in Patent documents 1 and 2).

An invention described in Patent document 1, relates to a rain gauge with a tipping bucket having a spherical catchment unit (or water gathering unit), for the place of the funnel 1 of the rain gauge with a tipping bucket. That is, the invention of patent document 1 has such configuration as to gather the rainwater caught by the spherical catchment unit having a circular catchment plane which can be projected as a certain circular area to all azimuth and zenith directions.

An invention described in Patent document 2 has a semi-spherical catchment unit, instead.

Patent Document 1: Japanese Laid-Open Patent Publication 2006-17462

Patent Document 2: Japanese Laid-Open Patent Publication 2003-21689

DISCLOSURE OF THE INVENTION

Problems to be Solved by the Present Invention

By the inventions described in the above-mentioned Patent documents 1 and 2 having the catchment units of either spherical or semispherical shape, it is possible to catch incoming rainwater flying from all azimuth and zenith directions all together and to measure the amount of caught rainwater by a tipping bucket underneath.

However, the configurations of the inventions described in Patent documents 1 and 2 are not for measuring both of the rainfall amount and the direction which the rainwater comes from.

That is, since the rainfall amount is described as the thickness of the rainwater which drops on the horizontal surface of the ground, for converting the amount (the weight) of the caught rainwater into the thickness, the weight needs to be divided by the area of the horizontal surface (the projected area on the horizontal plane of the catchment surface), and by the density of water (the weight per unit volume).

Therefore, in order to convert the amount of the rainwater into the thickness in case that the catchment unit is not placed on the ground, information about the dropping area of the rainwater caught by the catchment unit, such as which region on the ground the rainwater drops. The reason for this is because the dropping area depends on the dropping direction (zenith angle) of the rainwater.

Nevertheless, since the above-mentioned Patent documents 1 and 2 do not have any descriptions about the measurement of the dropping area, the inventions described in Patent documents 1 and 2 are not desirable for measuring the rainfall amount.

Further, as a conventional method for measuring rainfall amount, a method for calculating the rainfall amount, as illustrated in FIG. 1, on the basis of the number of times the tipping bucket 1B of a certain capacity tips over is adopted. Therefore, some errors may be observed, with regard to the accuracy of the measurement of the rainfall amount, at most in the range of the certain capacity of the tipping bucket 1B.

Also, as another technology for improving the measurement accuracy by using more complicated configuration, a technology is known for measuring the rainfall intensity by a light-emitting unit generating infrared laser bundle and by detecting the light scattered by the rainwater passing between the light-emitting unit and a light-receiving lens and being exposed to the laser bundle. Or, another technology is proposed for measuring the rainfall amount by gathering the rainwater from a cylindrical catchment cylinder into a chamber, sucking the retained water by a siphon tube, and sensing the amount of the sucked water by a capacitance sensor. However, in case of using these methods, the configurations are complicated and not desirable for measuring rainwater coming from each azimuth and zenith direction.

Therefore, the objective of the present invention is to provide an omnidirectional rain gauge which can measure the rainfall amount with respect to each azimuth and zenith direction by a facilitated configuration and with high accuracy, and a method for calculating the distinct direction, which rainwater comes from, by using the omnidirectional rain gauge.

Means for Solving the Problems

To achieve the above-indicated objective, according to a first aspect of the present invention, an omnidirectional rain gauge includes a catchment unit to catch rainwater; and a measurement unit to measure the amount of the rainwater caught by the catchment unit; wherein the catchment unit includes:

a plurality of conical cylinders which have individually different heights, and are overlaid so that bottom vertexes of the plurality of conical cylinders coincide with or come close to each other;

the overlaid plurality of conical cylinders are partitioned by partitions, which are arranged radially in a plurality of horizontal azimuth directions, to form a plurality of catchment cells;

each of the plurality of partitions is shaped as semicircle following a virtual spherical outer circumference;

the diameter of each of top opening parts, which are opposite to the bottom vertexes, of the overlaid plurality of conical cylinders is sized to follow the virtual spherical outer circumference; and the measurement unit, by the rainwater caught by each of the plurality of catchment cells of the catchment unit dropping in a drop of water of a certain weight, detects the number of the dropping drops of water with respect to each of the plurality of catchment cells, and determines the amount of the rainwater caught by each of the plurality of catchment cells on the basis of the total detected number of the drops of water.

To achieve the above-indicated objective, according to a second aspect of the present invention, a rain gauge includes a catchment unit to catch rainwater; and a measurement unit to measure the amount of the rainwater caught by the catchment unit; wherein the catchment unit comprises a plurality of funnels which have tubes of individually different diameters at the bottom parts, and are overlaid so that the tubes are inserted into one another in the order of the diameters;

the plurality of overlaid funnels are partitioned by a plurality of partitions, which are radially arranged in a plurality of horizontal azimuth directions, to form a plurality of catchment cells;

each of the plurality of partitions is shaped as semicircle following a virtual spherical outer circumference;

the diameters of the upper openings of the plurality of overlaid funnels are sized to follow the virtual spherical outer circumference; and the measurement unit, by the rainwater caught by each of the plurality of catchment cells of the catchment unit dropping in a drop of water of a certain weight, detects the number of the dropping drops of water with respect to each of the plurality of catchment cells, and determines the amount of the rainwater caught by each of the plurality of catchment cells on the basis of the total detected number of the drops of water.

In the first aspect or the second aspect described above, the measurement unit is configured to include:

a plurality of tubes of the same diameter, each of which is connected to the inside of water pipes provided at each of the bottoms of the plurality of catchment cells;

a switch unit which has a plurality of switches each of which is provided corresponding to each of the plurality of tubes; and detects drops of water which drop from the bottom tip portion of each of the plurality of tubes; and a processing unit which counts the number of the drops of water detected by the switch unit and converts the number into the amount of rainwater caught by each of the plurality of catchment cells In the first aspect or the second aspect described above, the omnidirectional rain gauge is further configured to include:

a second catchment unit for catching the drops of water which pass through each of the plurality of switches; and the processor unit which aggregates the amount of the drop of water caught by the second catchment unit, and determines, when there is a difference between the aggregated amount of the drop of water and total amount of rainwater caught by each of the plurality of catchment cells, that the difference is the amount of rainwater caught by a catchment cell which does not detect the amount of the drops of water.

Further, in the above aspect, each of the plurality of switches of the switch unit is featured by being configured to include a pair of electrode plates facing each other placed, with respect to each of the plurality of tubes, in the position apart by a prescribed distance from the bottom tip portions of the plurality of tubes; and the pair of electrode plates becomes conducted when a drop of water dropping from the bottom tip portion of the tube, corresponding to the pair of the electrode plate, passes between the pair of electrode plates facing each other.

Further, the pair of electrode plates facing each other can be featured by being placed so that the electrode plates are parallel in the direction of dropping of the drops of water.

Also, the pair of electrode plates facing each other can be featured by being placed so that the electrode plates are parallel in the direction of dropping of the drops of water and by including holes through which water drops pass.

EFFECTS OF THE INVENTION

The above configurations according to the present invention provide the following advantageous effects.

(1) The omnidirectional rain gauge in accordance with the present invention catches the rainwater from all spatial directions, with the catch ratio of nearly 100%, and thus can measure an accurate rainfall amount. By using the rain gauge of the present invention, it will be found that all the rainfall amount measured by rain gauges used in the past all over the world were underestimated.

For example, in a wind-prone region such as the top of Mount Fuji where the rainwater comes from the horizontal direction or even from the downward direction, the conventional rain gauge cannot catch such rainwater at all, therefore installation of rain gauges has been abandoned. In contrast, the rain gauge of the present invention enables the installation and the measurement.

Also, the rainfall amount relates to an estimation of the rainfall amount in a reservoir area or to an estimation of the downpour amount or the underground filtration amount at the time of landslide disaster on slopes, and thus the rainfall amount is inevitable and the most fundamental data for planning various water resource managements, or for preventing natural disasters such as landslides etc. In this context, using the rain gauge of the present invention can replace or correct the past estimation of rainfall amount of higher accuracy in conjunction with the land topography.

(2) The measurement accuracy of the rain gauge of the present invention (depending upon the weight of a drop of water passing through electrode terminals of a switch unit (approximately 0.1 g) and consistency thereof) can be significantly improved as much as more than 100 times of that of the conventional rain gauge with a tipping bucket, and thus it is possible to detect a very little rainfall (less than 0.5 mm) at the time of drizzle, which cannot be detected by the conventional rain gauge, and to measure the rainfall amount thereof.

(3) By applying the present invention, the rainwater can be caught and measured, and the measured result can be converted into the rainwater amount which collides with the ground of slope with an arbitrary azimuth direction and inclination. Therefore, the rain gauge of the present invention can make a great difference in the rainwater amount colliding with the ground of the windward slope and that of the leeward slope when a typhoon hits, which cannot be given by the conventional rain gauge. Also, contribution can be expected to studies and forecasts of occurrences of many disasters such as floods, caused by heavy rainfall.

BRIEF DESCRIPTION OF DRAWINGS

FIG. 16A is a conversion table, in accordance with the omnidirectional rain gauge of the present invention, which converts the one rainfall for hours measured in every 10 minutes into the number of drops of water which dropped in each cell in a 10 minute interval, and into the amount of water caught in per unit surface area of the sphere (g/cm2/10 min).

EXPLANATION OF REFERENCE NUMBERS

1 CATCHMENT UNIT
2 MEASUREMENT UNIT
20 TUBE
200 WATER PIPE
21 SWITCH UNIT
22 PROCESSOR UNIT
101-104 CATCHMENT WALLS (PARTITIONS)
111-113 FUNNELS
CH1-CH12 CATCHMENT CELLS, CHANNEL

BEST MODE FOR CARRYING OUT THE INVENTION

Embodiments of the present invention are explained below with reference to accompanying drawings. The embodiments are for illustrating the present invention, however, the application of the present invention is not limited thereto.

Figure 1:
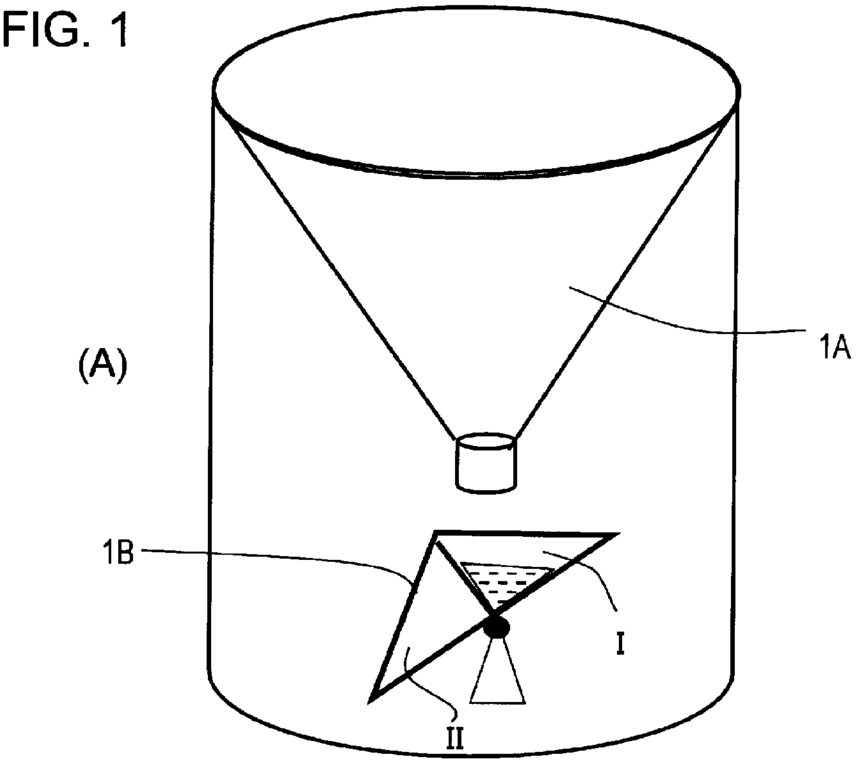
FIG. 1 is a drawing to explain an overview of a rain gauge with a tipping bucket.
Figure 1:
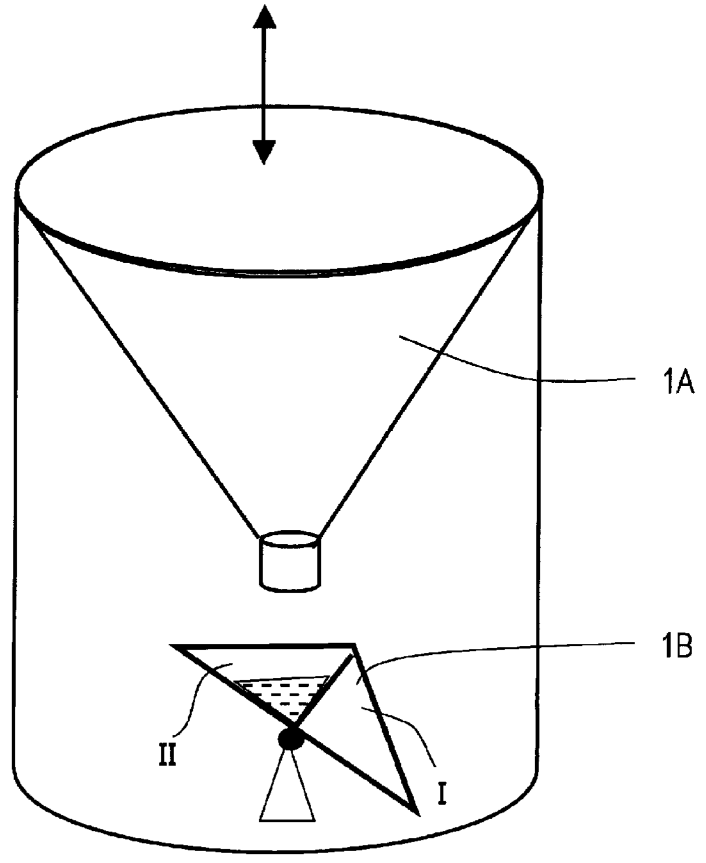
Figure 2:
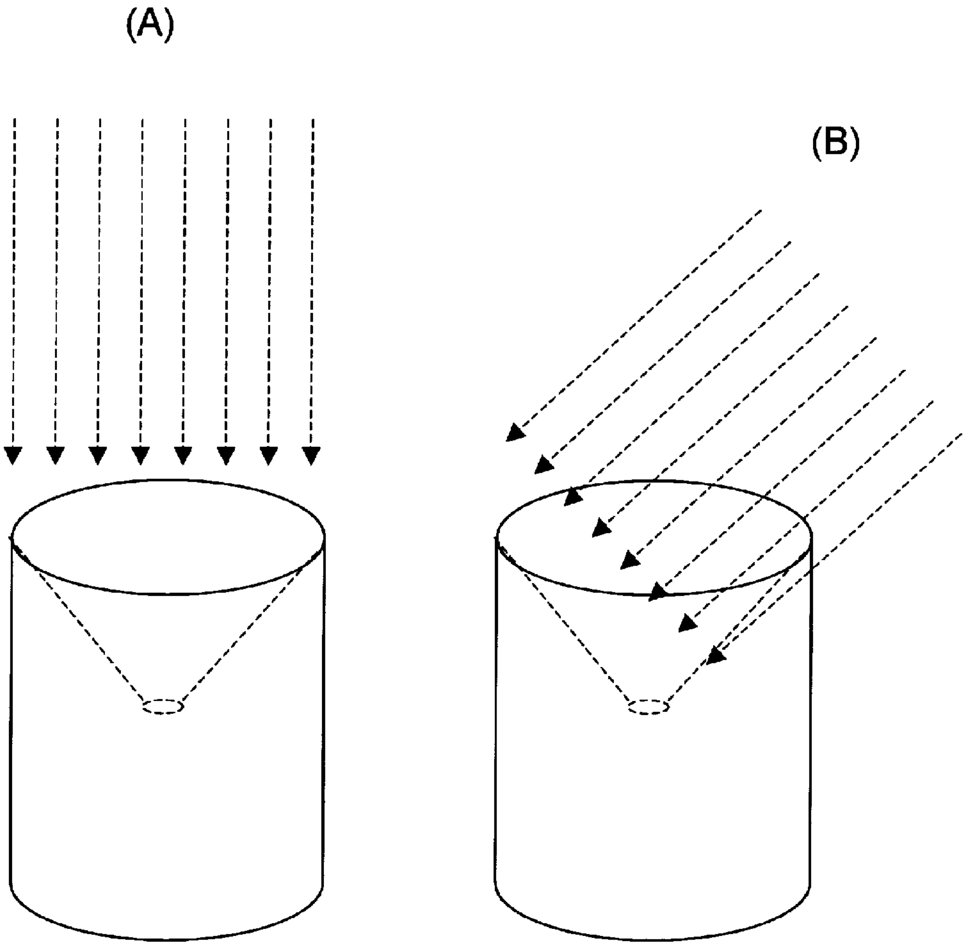
FIG. 2 is a drawing to explain problems in the rain gauge with a tipping bucket.
Figure 3:
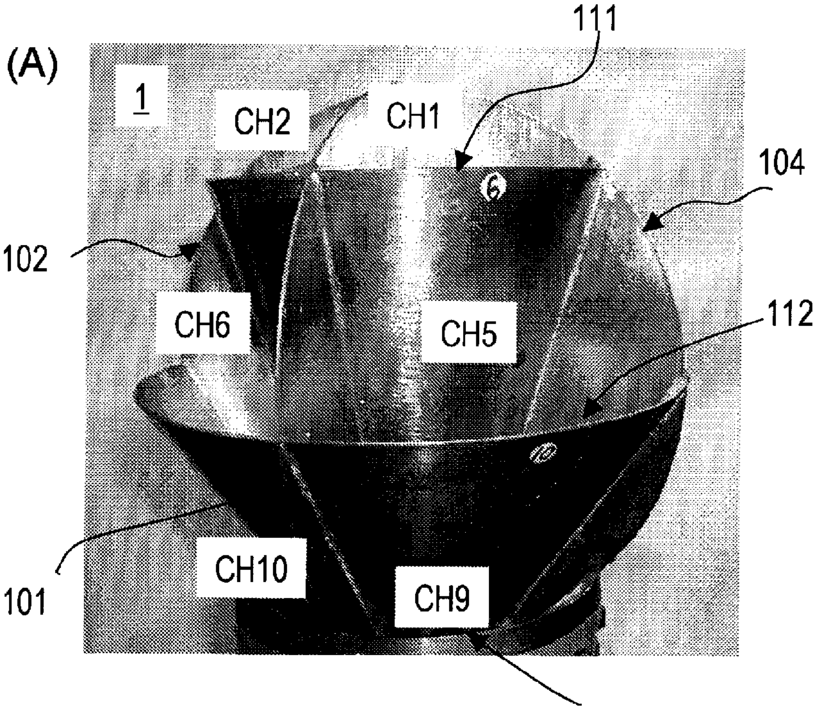
FIG. 3 is a drawing to illustrate a first configuration example of a water catchment unit in an Omnidirectional Rain Gauge according to the present invention.
Figure 3:
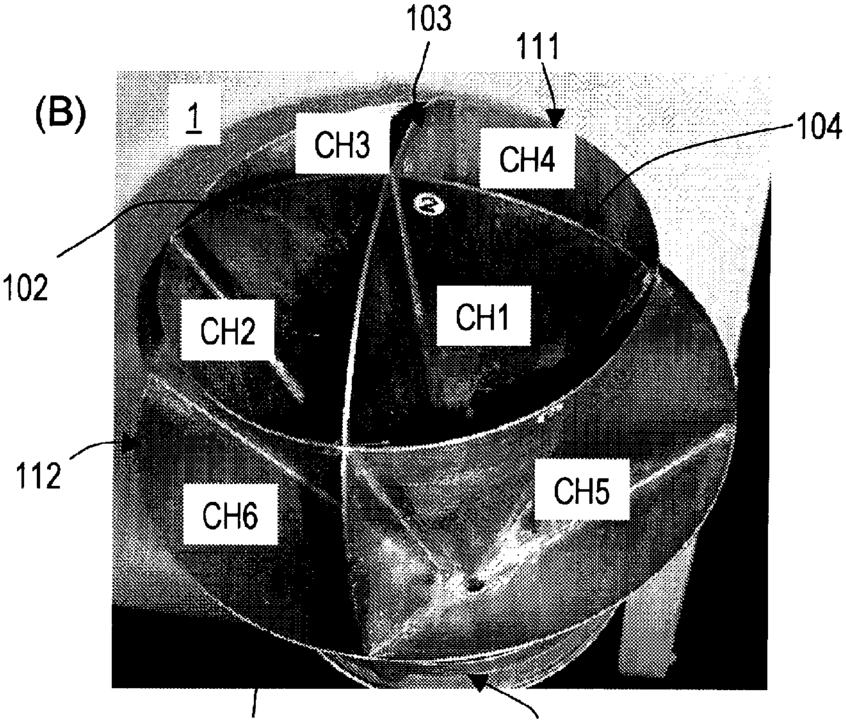

FIG. 3 is a drawing to illustrate a first configuration example of a water catchment unit of an omnidirectional rain gauge according to the present invention. FIG. 3(A) is a drawing to illustrate a picture of the configuration of the water catchment unit observed from a lateral view, and FIG. 3(B) is a drawing to illustrate a picture thereof from the above with an angle.

In the example illustrated in FIG. 3, the water catchment unit 1 is configured to have semicircle-plate-shaped catchment walls (referred to as "partitions" hereinafter) 101-104, which are arranged radially in four horizontal azimuth directions, and three funnels 111-113, which are shaped in circular truncated cone spread along the inclination in different directions, so that the partitions 101-104 and the funnels 111-113 are crossing one another.

Alternatively, the rain gauge has a plurality of funnels (conical cylinders) 111-113 which have individually different heights and are overlaid one another with the apexes facing the bottom coinciding with one another. The overlaid conical cylinders 111-113 are partitioned by the partitions 101-104 which are arranged radially in a plurality of horizontal azimuth directions. It can be explained that each of the partitions 101-103 are shapes as semicircles following the virtually spherical outer circumference, and that the diameters of the bottom planes and the diameters of the top planes of the overlaid conical cylinders are sized as to fit the virtually spherical outer circumference.

By this means, twelve catchment reservoirs (referred to as "catchment cells" (corresponding to channels CH1-CH12) hereinafter) are formed.

Figure 4:
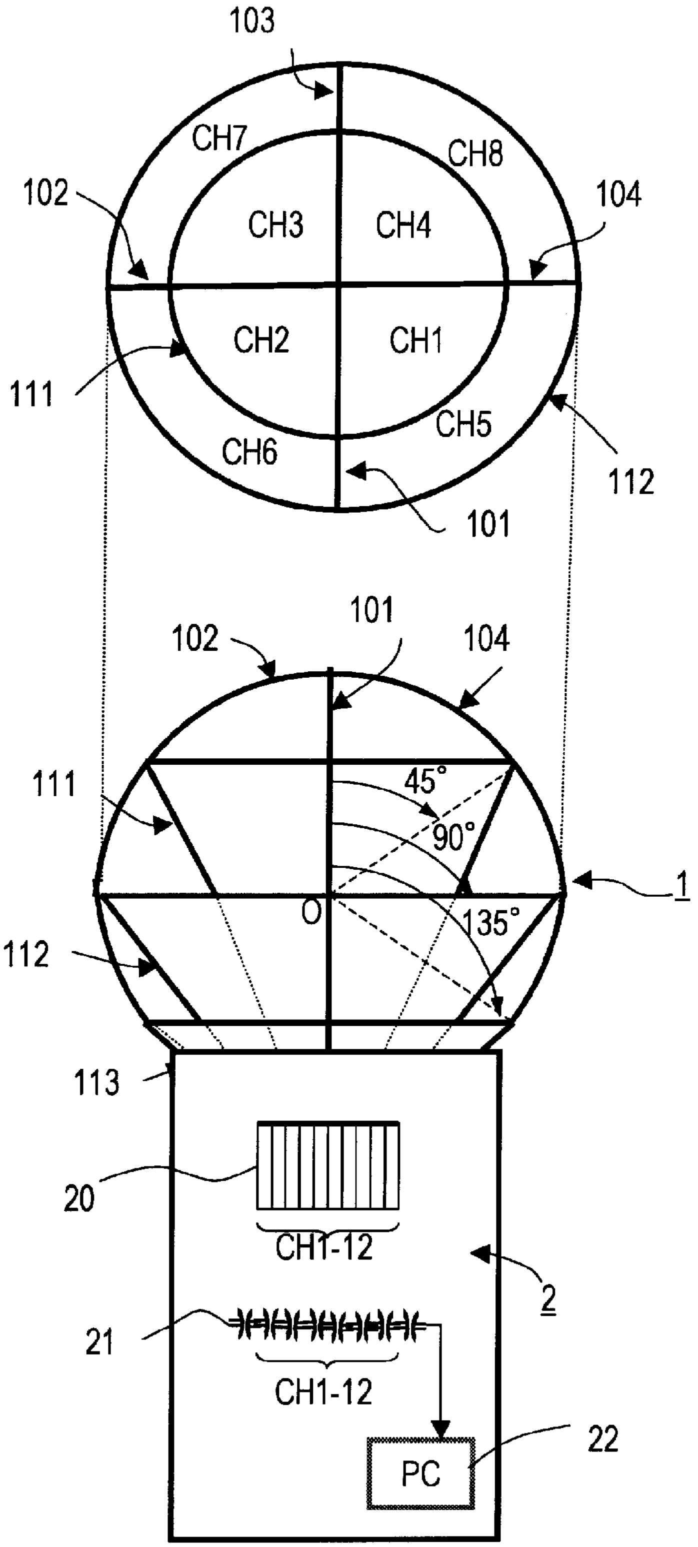
FIG. 4 is a drawing of an external structure of the omnidirectional rain gauge in accordance with the present invention including catchment unit 1.

FIG. 4 is a drawing to illustrate an external structure of the omnidirectional rain gauge in accordance with the present invention including the water catchment unit 1 illustrated in FIG. 3. A measurement unit 2 is provided underneath the catchment unit 1. FIG. 4(A) is a drawing of a top view, and FIG. 4(B) is a drawing of a lateral view. The measurement unit 2 is configured to have tubes 20, switch units 21, and a processor unit 22 such as a data logger or the like.

The three funnels 111-113 are overlaid in such manner that inclined sides of the truncated cones, which are open upward, are placed in positions corresponding to opening angles of 45 degrees, 90 degrees, and 135 degrees along the zenith directions with respect to the center "O" of the virtual sphere, and that the apexes of the truncated cones coincide.

Figure 5:
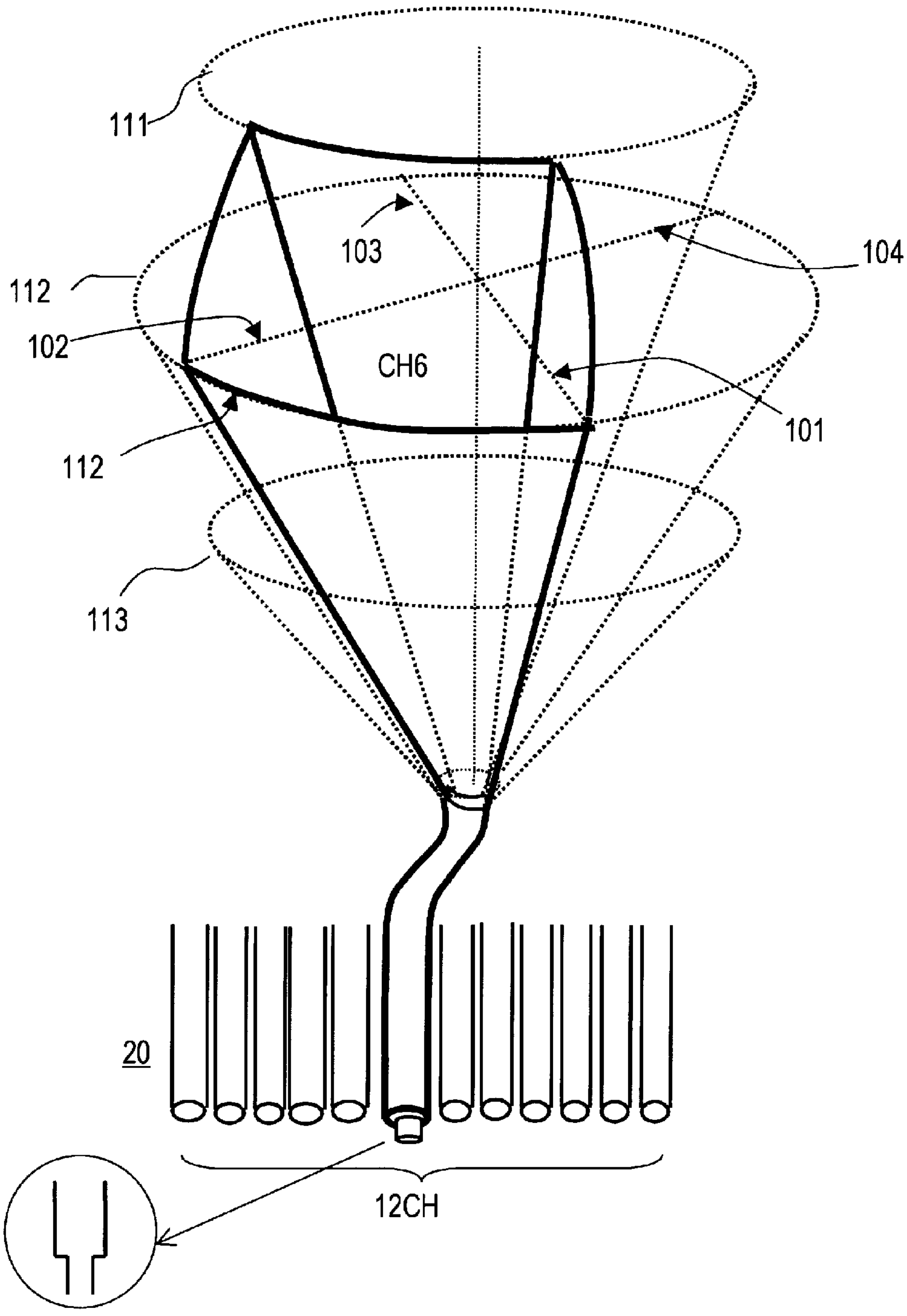
FIG. 5 is a drawing to illustrate a configuration of the catchment unit 1 in a skeletal structure for better understanding.

FIG. 5 is a drawing to illustrate a configuration of the catchment unit 1 in a skeletal structure to facilitate understanding. Heavy lines indicate the catchment cell corresponding to the channel CH6, which is formed by segmentation by the funnels 112 and 111, and the semicircle-plate-shaped partitions 101 and 102.

At the bottom of each of the catchment cells corresponding to twelve channels CH1-CH12, a water conducting hole is provided, which is connected to each of the twelve tubes 20 of the same diameter. At the lower left of FIG. 5, a cross-sectional view of a tip portion of the tubes 20 is illustrated.

To return to FIG. 4, a switch unit 21 is provided underneath the twelve tubes 20.

As a practical example, the switch unit 21 includes switches which are conducted by drops of water dropping from the bottom tip portions of the tubes 20.

Figure 6:
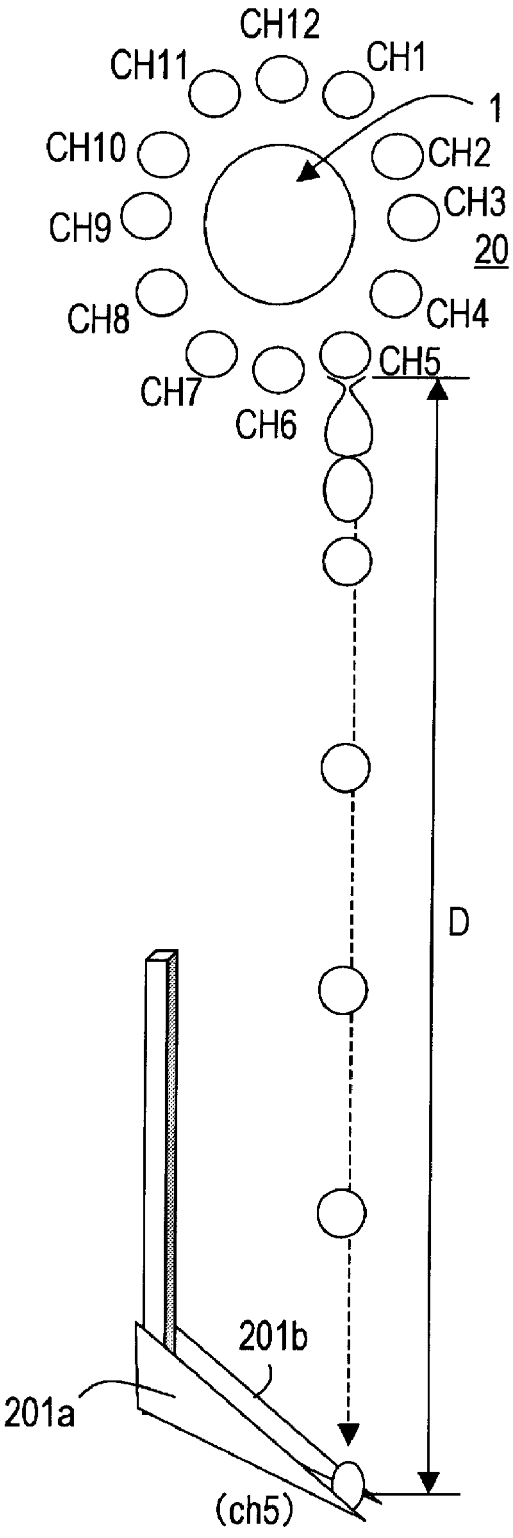
FIG. 6 is a drawing to explain a switch configuration of switch unit 21.

FIG. 6 is a schematic drawing to explain a switch of the switch unit 21. In the upper part of FIG. 6, an arrangement of the twelve channels CH1-CH12 formed by the twelve tubes 20 is schematically illustrated in a plane view.

Further, FIG. 6 illustrates a status of drops of water dropping from the tube 20 which is corresponding to the channel CH 5 among the twelve channels CH1-12.

Further, in FIG. 6, corresponding to each of tubes 20 for twelve channels CH1-CH12, a pair of electrode plates 201*a* and 201*b* is provided in a position apart downward by a distance D from each of tubes 20.

The height D is set so that drops of water dropping from the tubes 20 are reaching the pair of electrode plates 201*a* and 201*b* in drops of approximately the same diameter.

The drops of water dropping from the tube 20 corresponding to the channel CH5 become spherical shape of approximately the same size while dropping as far as the distance D, and reach the pair of electrode plates 201*a* and 201*b* which is then made electrically conducted.

Thus, the number of times of the electrical conduction of the electrode plates 201*a* and 201*b* corresponds to the number of drops of water, therefore, from the weight of a single drop of water and the number of drops of water, the rainfall amount which is caught by each channel of the catchment unit 1 can be determined.

Figure 7:
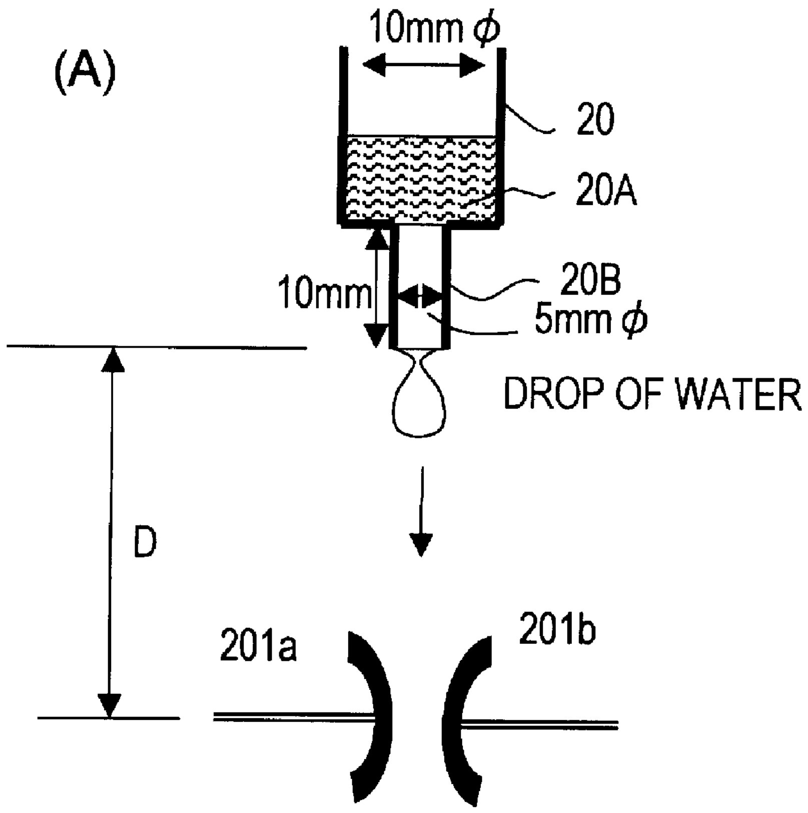
FIG. 7 is a drawing to explain a pair of electrode plates 201*a* and 201*b* in a partially magnified view.
Figure 7:
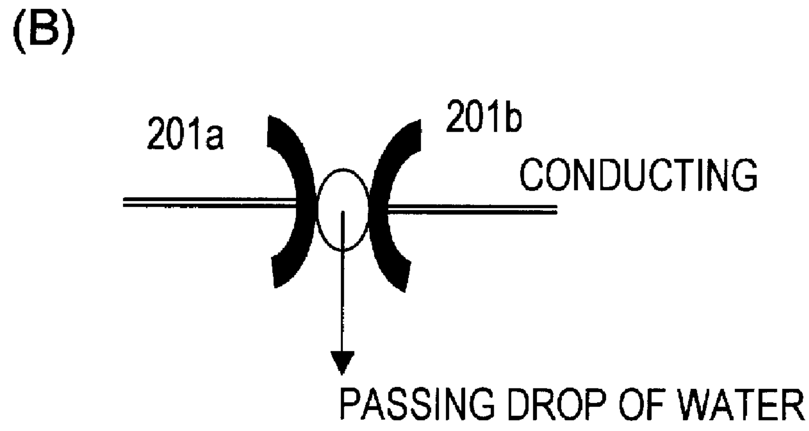

FIG. 7 is a drawing to explain a bottom tip portion of the tubes 20 and a pair of electrode plates 201*a* and 201*b* in a partially magnified view.

Underneath the tube 20, there is provided a filter 20A shaped as sponge net. By this means, the rainwater dropping from the tube 20 can drop in the drops of water of the same diameter and thus of the same weight.

As illustrated in FIG. 7(A), the pair of electrode plates 201*a* and 201*b*, corresponding to a catchment cell (a channel CH) of the catchment unit 1, is located in a position apart by the distance D from the bottom of the tube 20, and each of the pair of electrode plates 201*a* and 201*b* is connected by conducting wires to a processor unit 22 such as a data logger or the like. And as illustrated in FIG. 7(B) which is a magnified view of the pair of electrode plates 201*a* and 201*b*, when drops of water drop passing between the electrode plates 201*a* and 201*b*, the electrode plates 201*a* and 201*b* become electrically conducted. By this means, counting the timing of the conduction by the processor unit 22 such as a data logger or the like is possible.

As a practical example, the diameter of each of the twelve tubes 20 corresponding to twelve channels was configured to be 10 mm. And water conducting tube 20B which had the length of 10 mm and a diameter of 5 mm was provided underneath the filter 20A. At this time, the weight of a drop of water passing between the pair of electrode plates 201*a* and 201*b* was 0.14 g.

Figure 8:
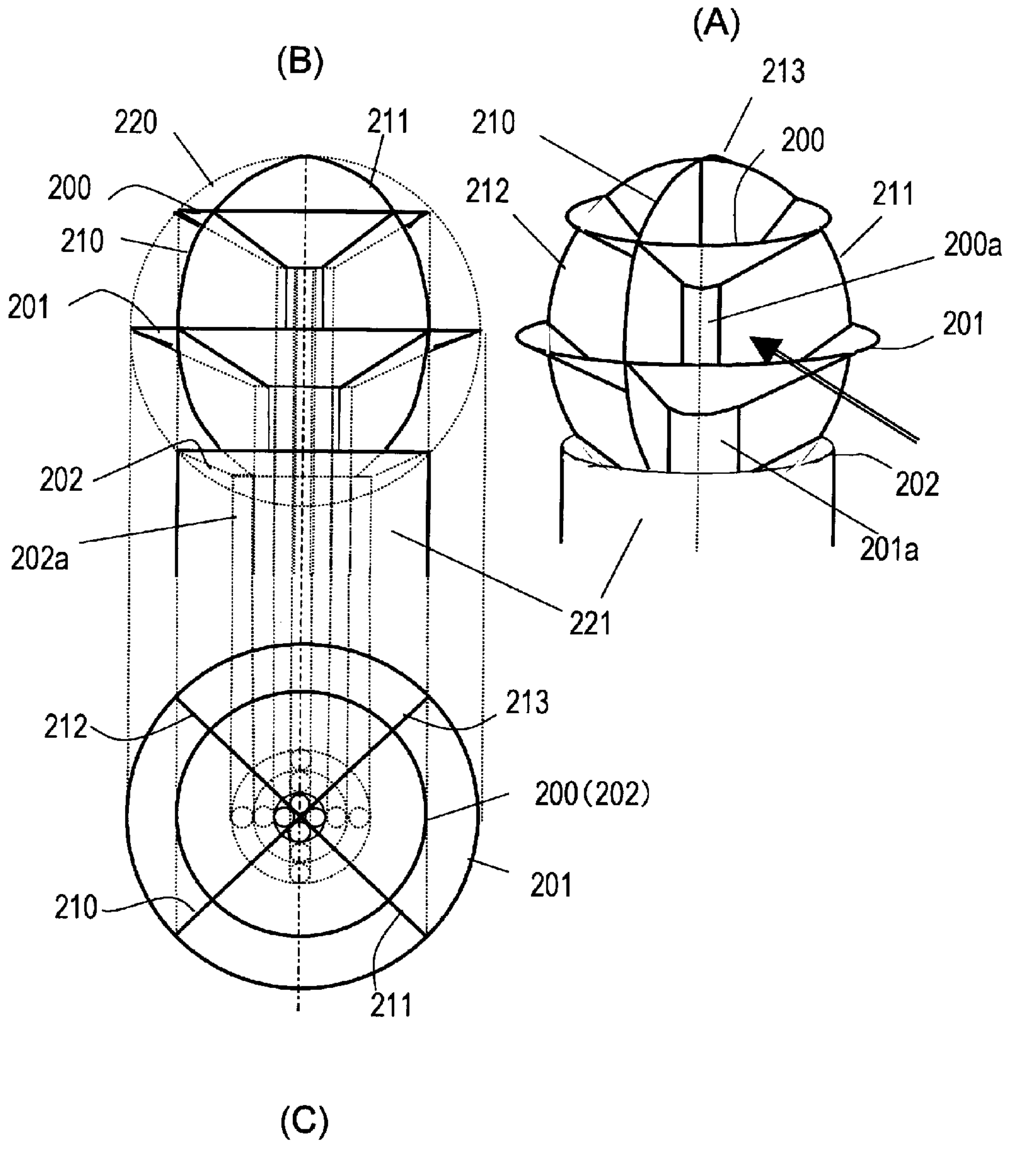
FIG. 8 is a diagrammatic perspective view to indicate a second configuration example of the catchment unit of the omnidirectional rain gauge in accordance with the present invention.

FIG. 8 is a drawing to illustrate a second configuration example of the catchment unit of the omnidirectional rain gauge in accordance with the present invention. FIG. 8(A) is a diagrammatic perspective view of an external appearance of the catchment unit, illustrating a status of the catchment unit placed on a catching stage 221 located on the top of a measurement unit which will be explained in the following.

FIG. 8(B) is a front view observed from the direction indicated by an arrow in FIG. 8(A), and FIG. 8(C) is a top view.

In comparison with the configuration of the first practical example illustrated in FIG. 4, the feature of the second practical example is such that three-tier funnels 200, 201 and 202 are provided. And water pipes 200*a*, 201*a*, and 202*a* of the funnel 200, 201, and 202, respectively, which have diameters in that order, are configured to insert into one another in a concentric fashion.

Further, the tiered funnels 200, 201 and 202 are partitioned into four azimuth directions by four partitions 210, 212, and 213.

And, the diameters of the funnels 200-202 and the partitions 210-213 are configured so that the outer rims of these are in contact with the virtually spherical outer circumference 220. Therefore, as with the first example, for each azimuth and zenith direction, catchment cells are formed corresponding to the partitioned twelve different directions.

The configuration of the catchment unit, as illustrated in FIG. 8, is formed by the tiered funnels of which water pipes have different diameters, and this configuration has an advantage to facilitate the manufacturing process compared with the configuration, as previously illustrated by FIG. 4, of overlaying the apexes of truncated cones which have different heights.

Figure 9:
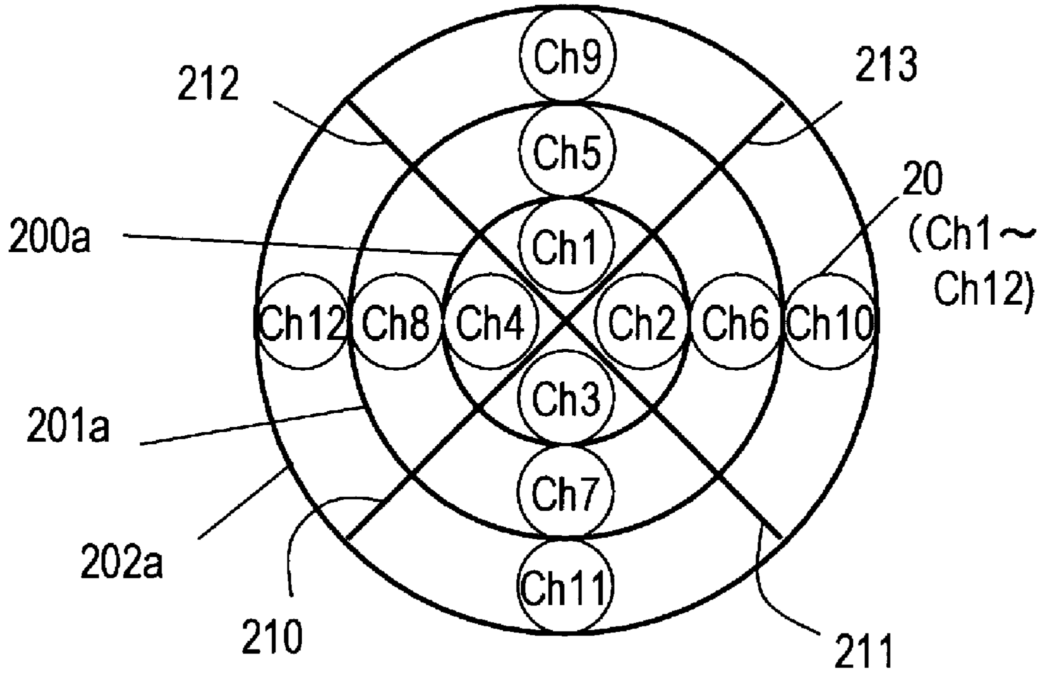
FIG. 9 is a drawing to illustrate in a magnified view, water pipes 200*a*-202*a* overlaid in concentric fashion observed from the downward direction of the catchment unit.

FIG. 9 is a drawing to illustrate in a magnified view, the water pipes 200*a*-202*a* overlaid in concentric fashion observed from the downward direction of the catchment unit, when the water pipes of different diameters of the funnels 200-202 are overlaid in concentric fashion.

The water pipe 201*a* of the funnel 201 is inserted into the inside of the water pipe 202*a* of the funnel 202, and the water pipe 200*a* of the funnel 200 is inserted into the inside of the water pipe 201*a* of the funnel 201.

Further, as illustrated in FIG. 9, inside of the water pipe 200*a* of the innermost funnel 200, bottom parts of four catchment cells are formed by four directional partitions 210-213 which partition the funnel 200. And thin tubes (for channels Ch1-Ch4) are inserted into the holes at the bottom parts, and are connected therewith.

Inside the water pipe 201*a* of the funnel 201, between the water pipe 201*a* and the water pipe 200*a* of a funnel 200, bottom parts of four catchment cells are formed by being partitioned by the four partitions 210-213. And thin tubes (for the channels Ch5-Ch8) are inserted into the holes at the bottom parts, and are connected therewith.

In the same manner, inside the water pipe 202*a* of the funnel 202, between the water pipe 202*a* and the water pipe 201*a* of a funnel 201, bottom parts of the four catchment cells are formed by being partitioned by four partitions 210-213. And thin tubes (for the channels Ch9-Ch12)) are inserted into the holes at the bottom parts, and are connected therewith.

Thus, twelve tubes for the channels Ch1-Ch12 are derived from the bottom part of the catchment unit.

Figure 10:
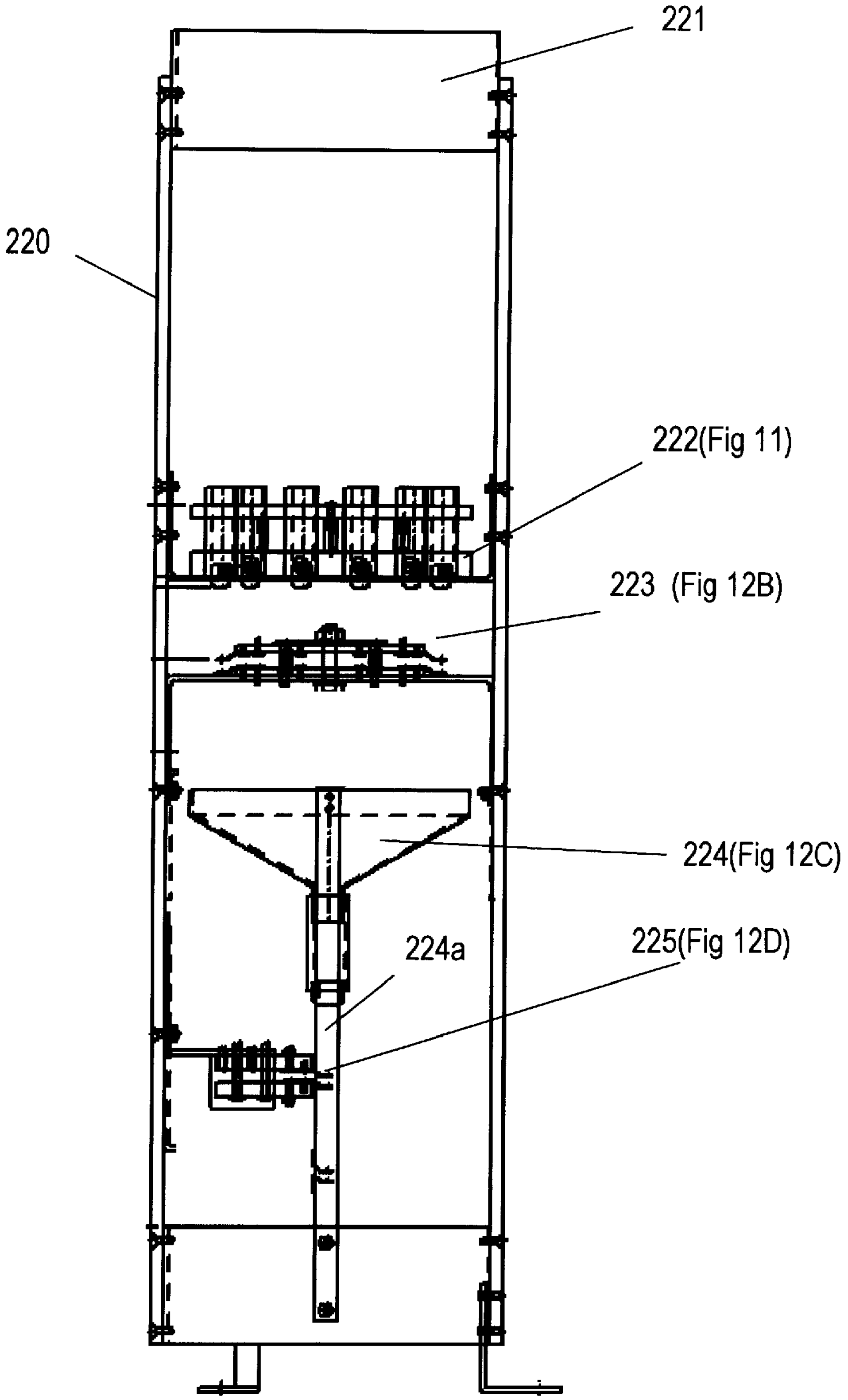
FIG. 10 is a schematic drawing of a cross-sectional view of the measurement unit to which the twelve tubes derived from the bottom part of the catchment unit are connected.

FIG. 10 is a schematic drawing of a cross-sectional view of the measurement unit to which the twelve tubes (for twelve channels Ch) derived from the bottom parts of the catchment unit are connected.

On the top of a cylinder-shaped outer shell 220, a catching stage 221 of the catchment unit is provided. Further, from the top of the outer shell 220, connecting units 222 for the twelve tubes, a switch unit 223 having rainwater detecting switches located in positions respectively corresponding to the twelve tubes, and a catchment funnel 224 for catching all the rainwater are provided in that order.

The catchment funnel 224 has a tube 224*a*, and has a separate water drop detecting switch 225 along the tubes 224*a*.

The detail of a practical example of each component configuring such measurement unit will be explained in the following.

Figure 11:
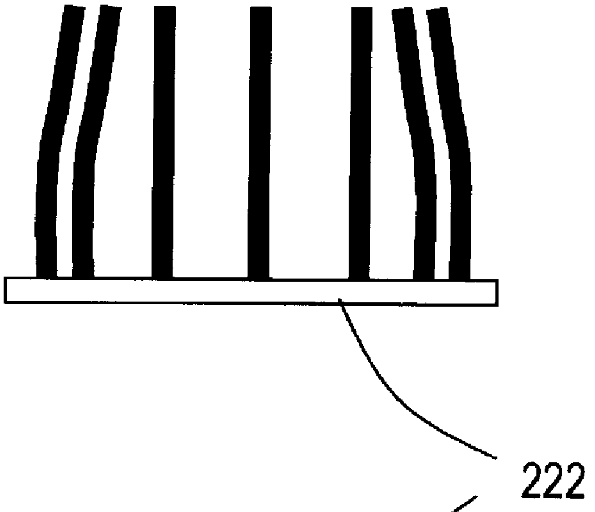
FIG. 11 is a schematic drawing to explain tube connecting unit 222.
Figure 11:
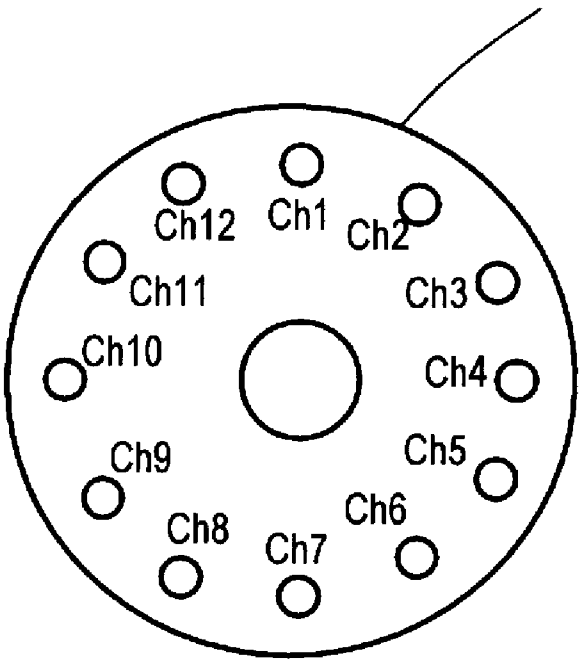

FIG. 11 is a drawing to explain the tube connecting unit 222. FIG. 11A is a schematic drawing of a cross-sectional view of the tube connecting unit 222, and FIG. 11B is a drawing observed from the bottom side of the tube connecting unit 222.

The tube connecting unit 222 is disk-shaped and has twelve holes Ch1-Ch12 corresponding to the twelve channels for receiving each of twelve tubes. The rainwater which passed through the twelve tubes drops respectively from these holes Ch1-Ch12.

Figure 12:
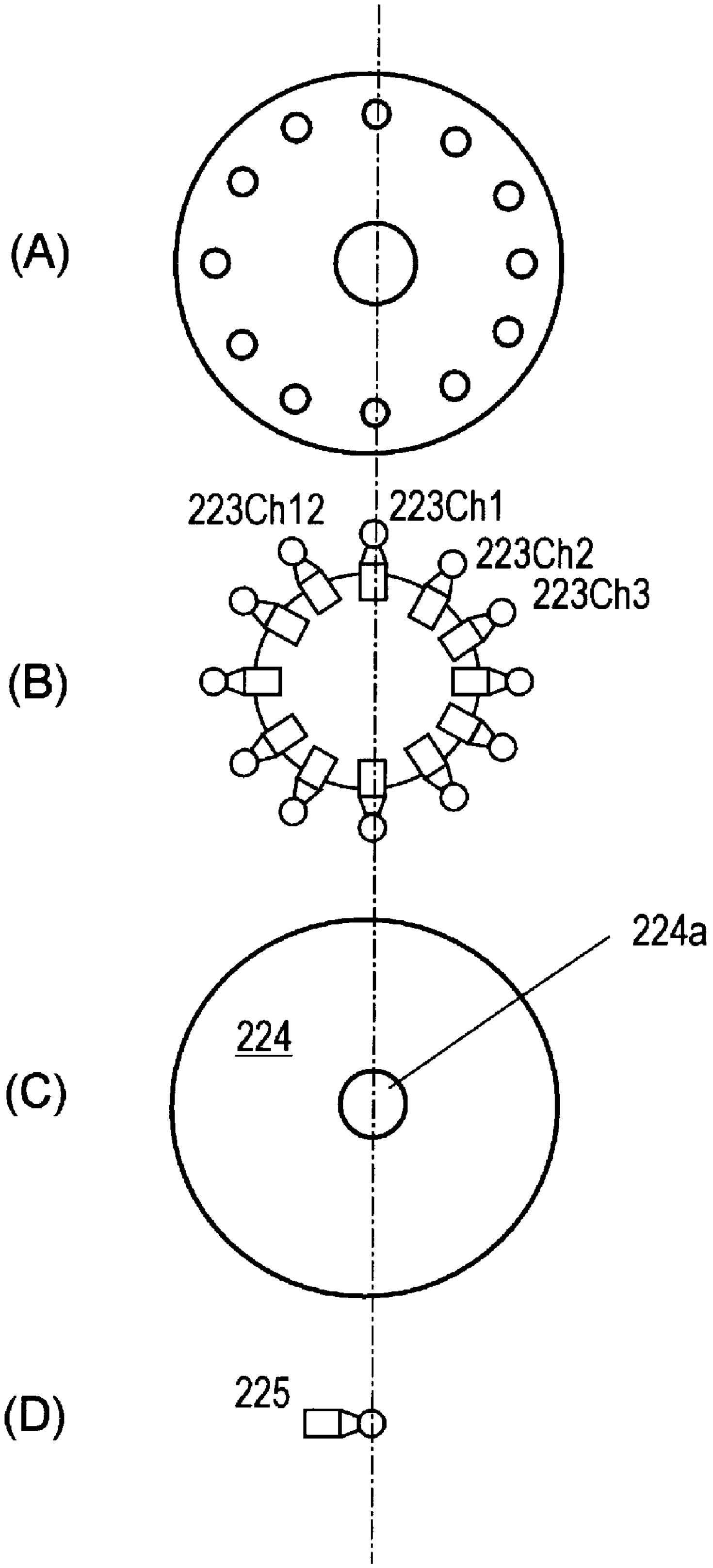
FIG. 12 is a drawing to illustrate a plane view of tube connecting unit 222 for twelve tubes, switch units 223, catchment funnel 224 and catchment switch 225.

FIG. 12 is a drawing to illustrate a plane view of the tube connecting unit 222 for the twelve tubes, switch units 223, water catchment funnel 224, and the catchment switch 225, in the order of the alignment on the outer shell 220 from the top.

FIG. 12(A) illustrates the tube connecting unit 222 illustrated in FIG. 11. FIG. 12(B) illustrates a plane view of the switch unit 223, FIG. 12(C) illustrates a plane view of the catchment funnel 224, and FIG. 12(D) illustrates a plane view of the switch 225.

The switch unit 223 is disk-shaped and has radially arranged twelve switches 223Ch1-223Ch12. And the alignment positions the switches 223Ch1-223Ch12 correspond to positions of the twelve holes Ch1-Ch12 formed on the tube connecting unit 222.

Further, the catchment switch 225 is placed so as to detect rainwater dropping from the tubes 224*a* of catchment funnel 224.

Figure 13:
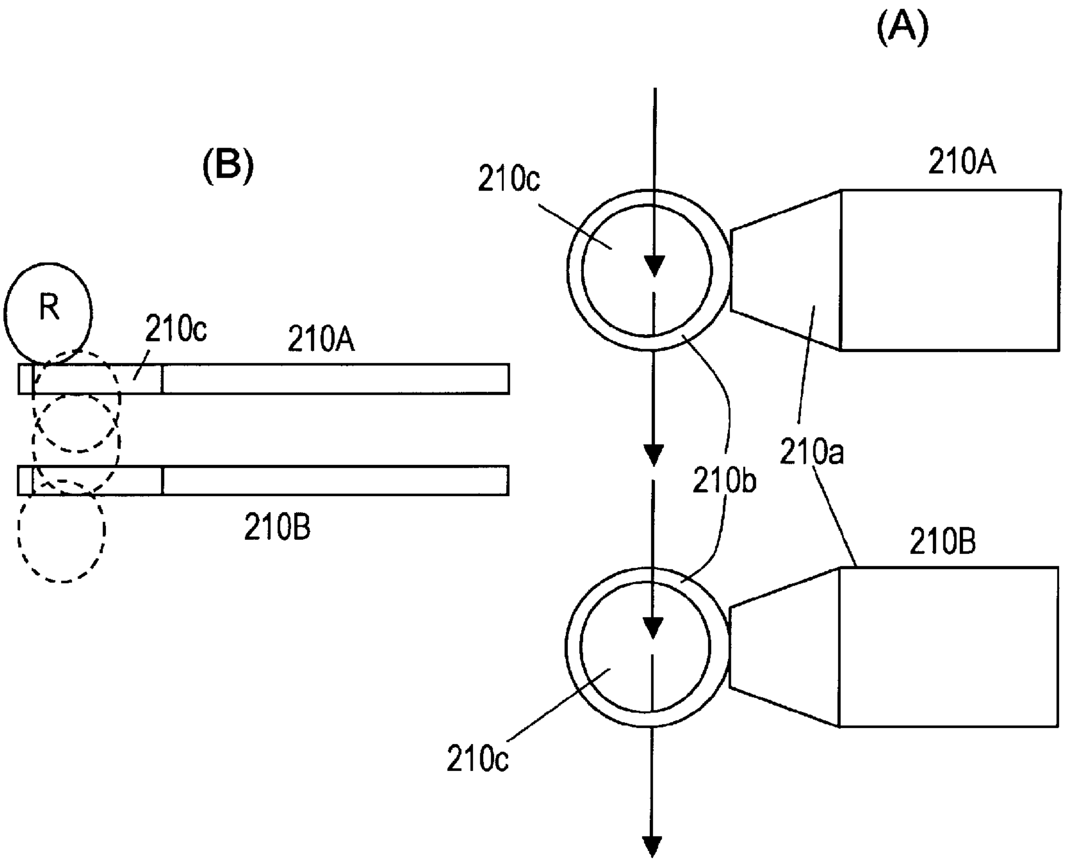
FIG. 13 is a drawing to illustrate a common configuration of each switch of twelve switches 223*ch*1-223*ch*12 and single catchment switch 225.

FIG. 13 illustrates a common configuration of each switch of the twelve switches 223*ch*1-223*ch*12 of the switch unit 223 and a single catchment switch 225, which are referred simply as a "switch" and explained in the following.

The switch is configured by a pair of upper and lower electrode terminals 210A and 210B. In one practical example, the pair of upper and lower electrode terminals 210A and 210B has rings 210*b* which have body parts 210*a* and through holes 210*c*.

By such switch configuration of the pair of upper and lower electrode terminals, the detection of drops or water dropping from the tubes connected to the tube connecting unit 222 and from the tube 224*a* of the catchment funnel 224.

In other words, as illustrated in FIG. 13(B), drops of water, when dropping, enter into the through holes 210*c* of the switch, and contact the pair of upper and lower electrode terminals 210A and 210B in the interspace between them. By this means, the electrode terminals 210A and 210B become electrically conducted. Thus by electrically sensing this status, the detection of dropping of the drops of water is made possible.

In such configuration of the second practical example, the rainwater is detected and counted by each of the twelve switches 223Ch1-223Ch12 of the switch unit 223. Therefore, by the same manner as explained with regard to the former practical example, detection of the rainwater dropping with respect to all the twelve cells is possible.

Here, the reason for configuring the switch by the pair of upper and lower electrode terminals 210A and 210B, as illustrated in FIG. 13, is because the upper and lower electrode terminals can detect with higher certainty the drops of water compared with the example of using a pair of parallel electrode terminals as explained previously in FIG. 7, even if the position at which drops of water drop is deviated to some extent in the horizontal direction.

That is, even if a drop of water R, as illustrated in FIG. 13(B), drops on a position deviated from the center of the holes of the electrode terminals 210A and 210B of the switch, the drop of water R can be caught.

In FIG. 13, the configuration of the pair of upper and lower electrode terminals 210A and 210B having rings 210*b* which have the through holes 210*c* is explained, however, important thing here is configuring the pair of upper and lower electrode terminals, and thus the shapes of the pair of electrode terminals are not limited to the example of having the rings 210*b* with the through holes 210*c*. For example, U-shape such as a part of a ring is open, or merely needle-like-shape is applicable.

Further, in the configuration of this practical example, the reason for the catchment funnel 224 and the switch 225 being provided underneath the switch unit 223 of twelve switches 223Ch1-223Ch12 is as follows.

The catchment funnel 224 can gather the rainwater dropping further after passing through the twelve switches 223Ch1-223Ch12. And the amount of the rainwater caught by the catchment funnel 224 can be detected by the switch 225.

Here, in case that the detection of the rainwater by any of the twelve switches 223Ch1-223Ch12 fails, according to the configuration of the previous practical example, the rainwater of the failed cell cannot be detected.

Contrary to this, by the configuration of FIG. 10, in case that any of the twelve switches 223Ch1-223Ch12 fails, difference may occur between the total rainwater amount detected by each of twelve switches 223Ch1-223Ch12 and the total amount detected by the switch 225 of the rainwater gathered by the catchment funnel 224.

In such case, the difference is the rainwater amount which could have been detected by a switch which failed in the detection among the twelve switches 223*ch*1-223*ch*12.

Thus the difference in the rainwater amount can be related to the rainwater amount of the cell corresponding to the switch which failed in the detection.

In this manner, by the second practical example, even if any of the twelve switches 223Ch1-223Ch12 fails in the detection, the rainwater amount with respect to each azimuth and zenith direction can be detected with high accuracy.

Next, a method for determining an accurate rainfall amount by using the rain gauge explained above through specifying the azimuth direction and the zenith angle in which the rainwater drops will be explained.

Figure 14:
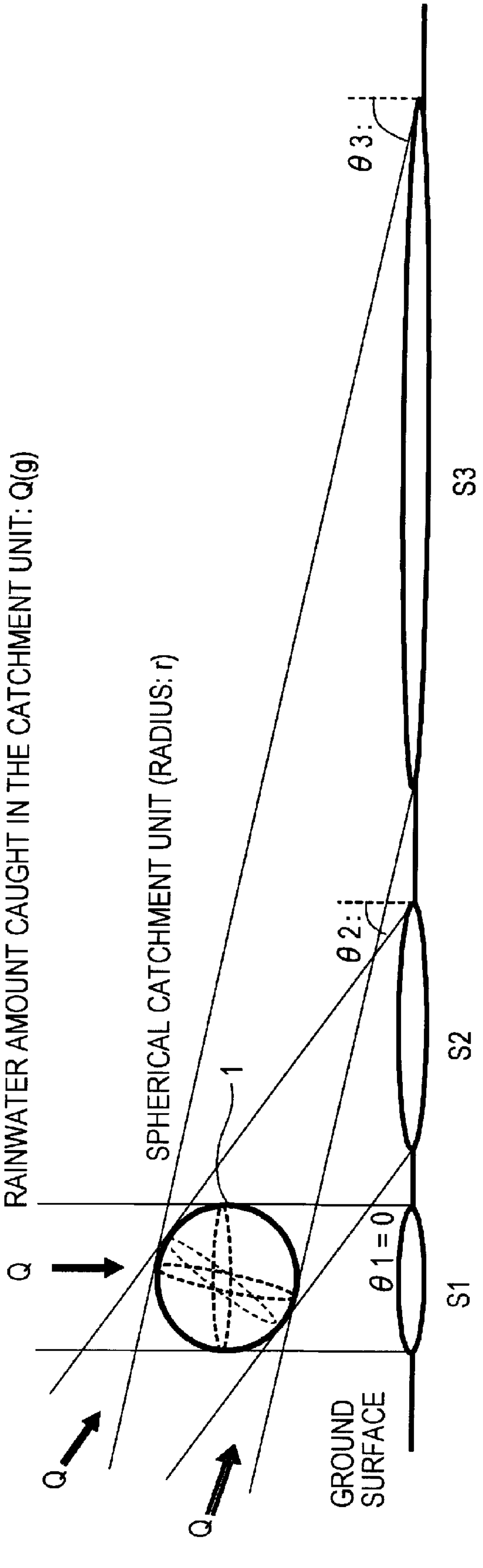
FIG. 14 is a schematic drawing to illustrate the relation ship between amount (Q) and rainfall amount (P) of the rainwater which comes in the spherical catchment unit placed on the ground.

Here, relation between the amount (Q) of the rainwater, which comes in the spherical catchment unit placed on the ground, and the rainfall amount (P) is examined by a schematic diagram illustrated in FIG. 14.

In FIG. 14, the amount (Q, the unit: g) of the rainwater which comes in the virtually spherical catchment unit 1 (radius: r) placed on the ground, and the rainfall amount (P, unit: mm) are different amounts. The relation between the amount (Q) of the rainwater which comes in the virtually spherical catchment unit 1 and the rainfall amount (P) is described by the following formula.

$$Q=\rho\cdot P/10\cdot\pi r^2/\cos\theta \qquad \text{Formula 1}$$

Here, θ indicates the zenith angle of the dropping direction in which the rainwater drops with the vertex being 0 degrees. And ρ indicates the density of a rainwater, which is 1 g/cm$^3$.

In the calculation of the projected area S (unit: cm$^2$) on the ground of the virtually spherical catchment unit, the projected area S differs according to the zenith angle θ. In FIG. 14, the projected areas S1, S2, and S3 will be studied.

Here, the projected areas S1, S2, and S3 are such that S1=πr2(=S), S2(=πr2/cos θ2), and S3=(πr2/cos θ3), with the magnitude relation such that S1<S2<S3.

On the other hand, rainfall amount P1, P2, and P3 for projected areas S1, S2, and S3 are described as follows.

$$P1=10Q/(\rho\cdot\pi r2)$$

$$P2=10Q/(\rho\cdot\pi r2)\cdot\cos\theta 2$$

$$P3=10Q/(\rho\cdot\pi r2)\cdot\cos\theta 3$$

Therefore, the magnitude relation of the rainfall amounts is such that P1>P2>P3.

Here, since a 3-dimensional rain gauge in accordance with the present invention measures the dropping direction (the azimuth direction and zenith angle) and the amount (the weight) per direction of the rainwater, the amount per unit area of the rainwater which hits the surface of the arbitrary direction (an azimuth direction D, and a zenith angleθ) can be calculated. On the other hand, since a 1-dimensional rain gauge such as a rain gauge with a tipping bucket cannot measure the dropping direction of the rainwater, the amount per unit area of the rainwater which hits the surface of the arbitrary direction cannot be measured. In such aspect lies the most distinctive advantage of the 3-dimensional rain gauge in accordance with the present invention.

Figure 15:
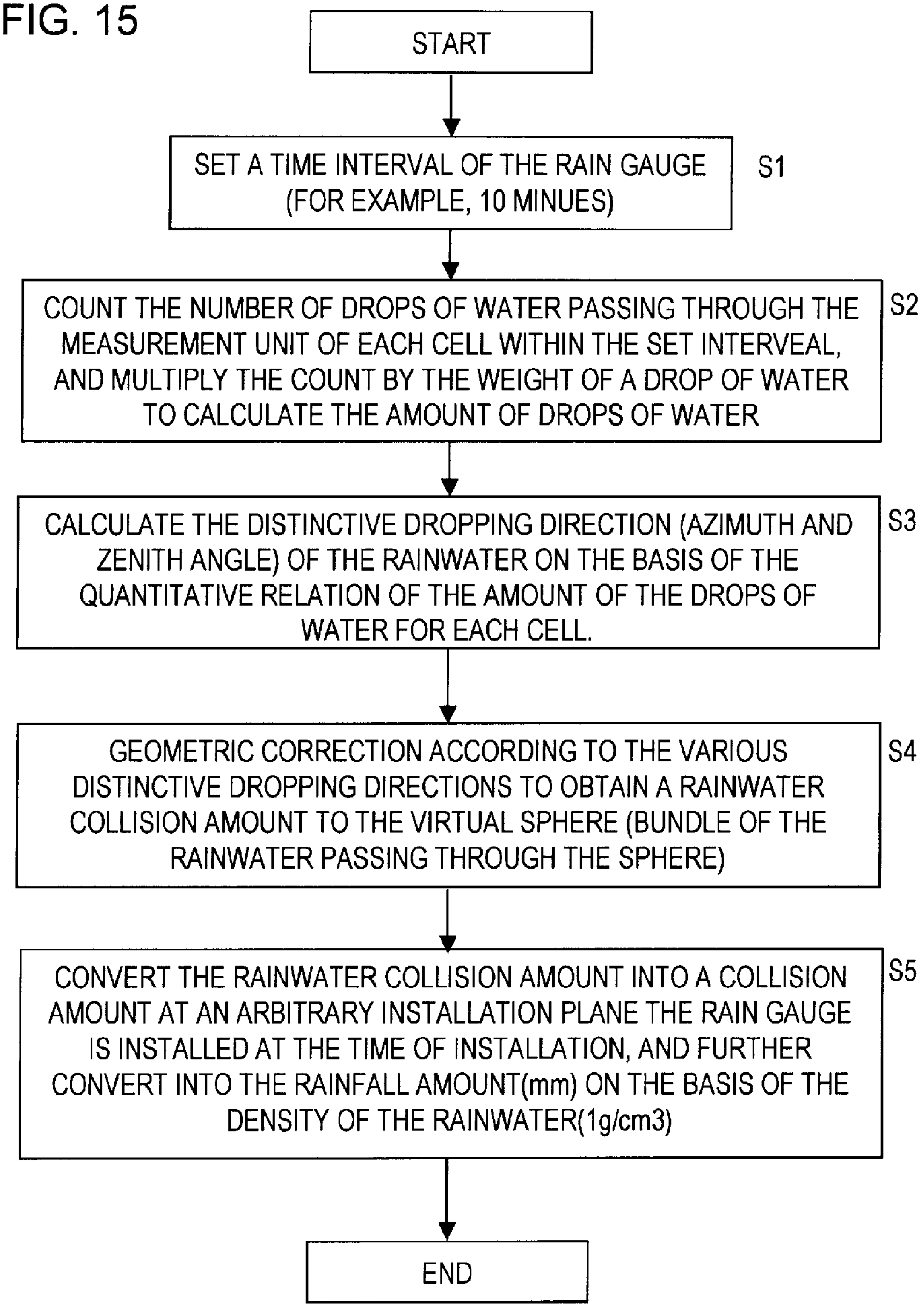
FIG. 15 is a flow diagram of the processing procedures according to the present invention to determine the rainfall amount by considering the projected area.

FIG. 15 is a flow diagram of the processing procedures according to the present invention for determining the rainfall amount by considering the projected area as illustrated in FIG. 14. This process flow is performed by the processor unit 22 such as a data logger or the like provided with the measurement unit 2 illustrated in FIG. 4.

For the first, upon starting processing, a time interval of the rain gauge is set, for example, as 10 minute interval (step S1).

After that, the number of drops of water passing through the switch unit 21 of the measurement unit 2 of each cell in the preset time interval (10 minute) is counted with respect to each of the twelve cells (channel: CH), and the amount of drops of water is calculated by multiplying the count of the drops of water by the weight of a drop of water (step S2).

FIG. 16A illustrates a conversion table, in accordance with the omnidirectional rain gauge of the present invention, which converts the one rainfall for hours measured in every 10 minutes into the number of drops of water which dropped in each cell in a 10 minute interval, and into the amount of water caught in per unit surface area of the sphere (g/cm$^{2/10}$ min).

In FIG. 16A, the numbers of the catchment cells CH1-CH12 are illustrated in the cross direction, and the numbers of the drops of water per 10 minutes (drops/10 min) are illustrated in section I in the vertical direction.

Section II illustrates the weight of drops of water (g/10 min) corresponding to the number of drops of water, calculated by the weight of one drop of water being 0.14 g.

Section III illustrates the area (cm2) of the virtually spherical outer circumference of the catchment cell, which is equivalent to the area of curved surface corresponding to each catchment cell.

Section IV illustrates the amount of water caught in a unit spherical surface area of the catchment cell (g/cm2/10 min). Since the spherical surface areas of the catchment cell differ as illustrated in the above section III, it is converted, considering the surface area, into the amount of water caught in a unit area.

On the basis of the table data of FIG. 16A, in FIG. 15, a distinctive dropping direction of the rainwater (the azimuth direction and in the zenith angle) is calculated from the quantitative relation of the drops of water of each cell (step S3).

Figure 16B:
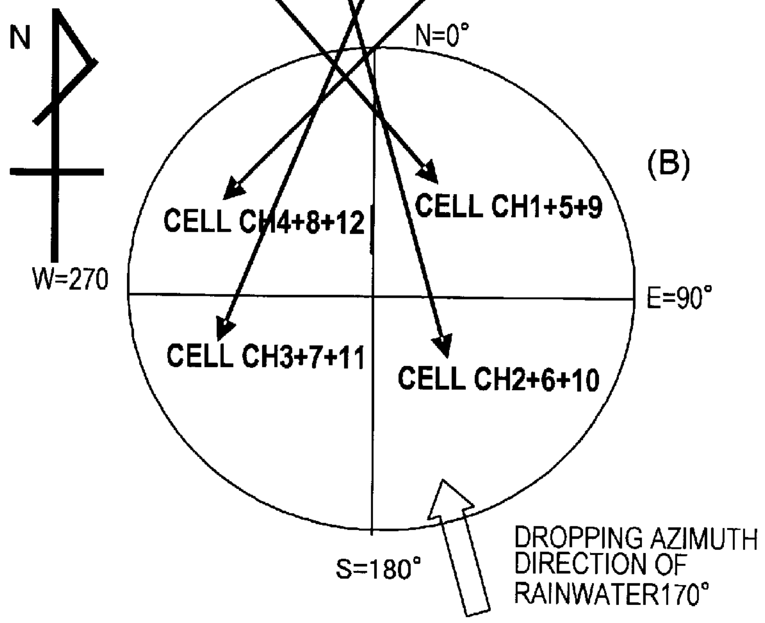
FIG. 16B is a drawing to illustrate aggregated values of the observed data of FIG. 16A with respect to the four horizontal directions.

FIG. 16B is a drawing for explaining a method for calculating the distinctive dropping direction of the rainwater, and illustrating aggregated values of the observed data formatted in the table of FIG. 16A with respect to four horizontal directions.

That is, section[A] of FIG. 16B illustrates a group of catchment cells CH1, 5, and 9 corresponding to the azimuth direction of 0-90 degrees, a group of catchment cells CH2, 6, and 10 corresponding to the azimuth direction of 90-180 degrees, a group of catchment cells CH3, 7, and corresponding to the azimuth direction of 180-270 degrees, and a group of catchment cells CH4, 8, and 12 corresponding to the azimuth direction of 270-360 degrees.

In section[B] of FIG. 16B, the horizontal azimuth direction indicating the maximum dropping amount of drops of water is illustrated by an arrow as the rainwater dropping direction of 170 degrees.

Figure 17:
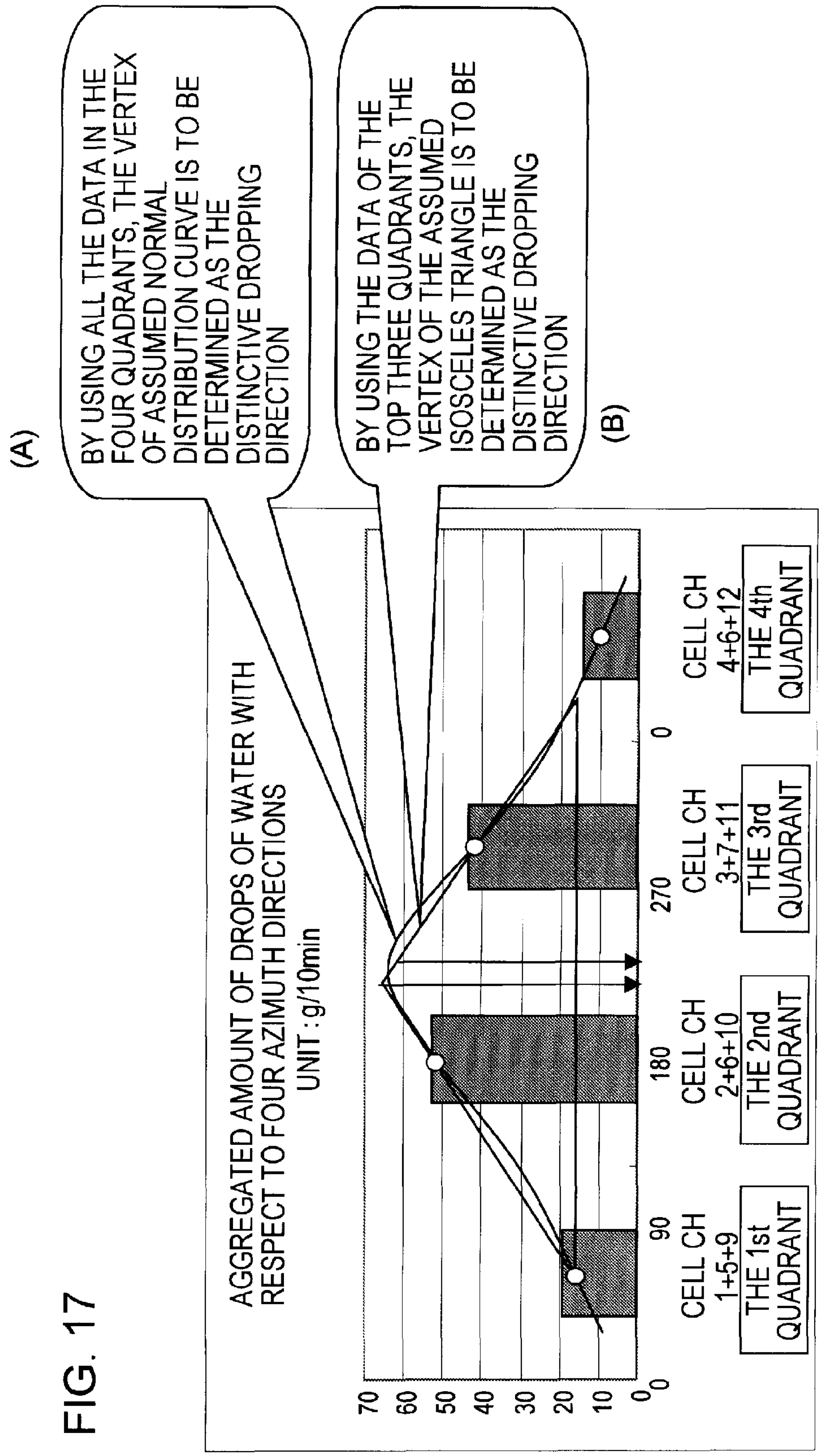
FIG. 17 is a drawing to illustrate a method for determining the dropping azimuth angle of the rainwater.

A method for calculating the rainwater dropping azimuth direction indicating the maximum dropping amount of drops of water can be explained by FIG. 17.

FIG. 17 is a drawing, on the basis of FIG. 16B, to illustrate by bar graphs in the vertical direction, the magnitude of the numbers illustrated in FIG. 16B[A] in four quadrants with respect to four directions (0-90 degrees, 90-180 degrees, 180-270 degrees, and 270-360 degrees).

FIG. 17 illustrates two example methods for calculating the distinctive azimuth direction of the dropping amount of drops of water.

The first method is, on the basis of all the data in the four quadrants, by assuming that the dropping amounts of drops of water of each quadrant are normally-distributed, to determine the vertex of the assumed normal distribution curve to be the distinctive dropping direction of water ([A]).

The second method is, by plotting the numbers of the top three quadrants on the sides of an isosceles triangle, to determine the vertex of the isosceles triangle to be the distinctive dropping direction of drops of water ([B]). As illustrated in section [B] of FIG. 16B, by either of the two methods, a direction around 170 degree, in a clockwise direction with the north direction being as 0 degrees, can be determined as the distinctive dropping azimuth direction.

On the other hand, the zenith angle of the distinctive drop is determined, on the basis of FIG. 16C, by a method which will be explained in FIG. 18.

Figure 16C:
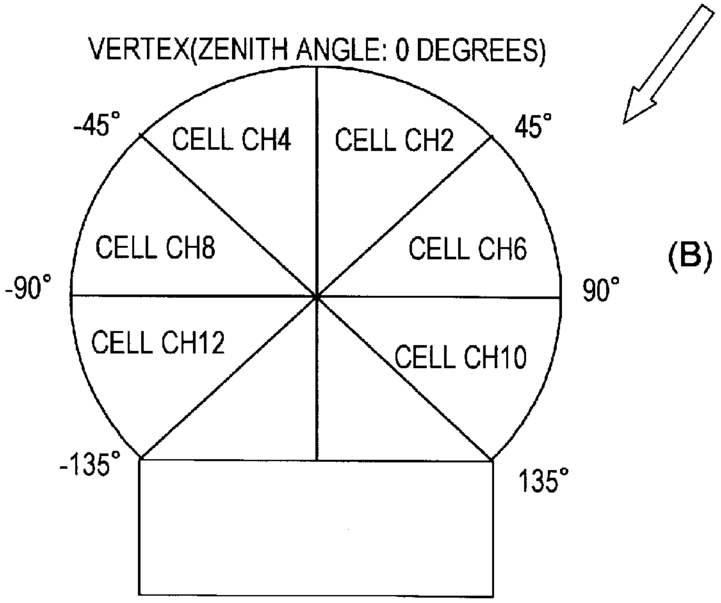
FIG. 16C is a drawing to illustrate aggregated values of the observed data of FIG. 16A divided in the north-south direction with respect to the zenith angles.

FIG. 16C is a drawing to explain the method for determining the zenith angle of the distinctive drop of rainwater. In the drawing, the amounts of the rainwater caught by the six cells, including the cross-section at the distinctive dropping azimuth direction of 170 degree, are selected and aligned in the order of the zenith angle.

Figure 18:
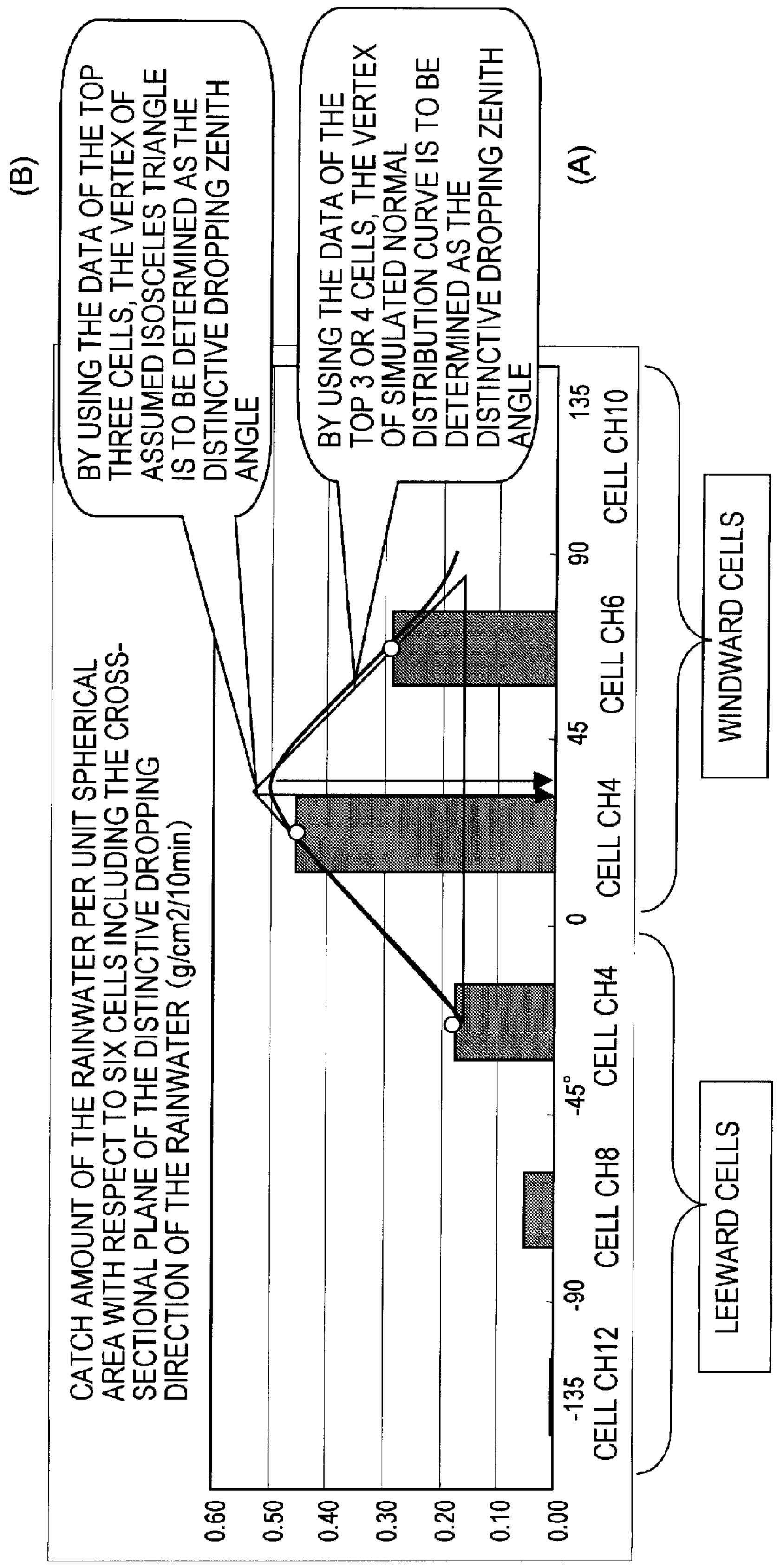
FIG. 18 is a drawing to illustrate a method for determining the dropping zenith angle of the rainwater.

FIG. 18 is a drawing to illustrate by bar graphs in the vertical direction the magnitude of the numbers which are illustrated in FIG. 16C[A].

In FIG. 18, as in the same manner of the explanation of FIG. 17, two example methods for determining the distinctive azimuth direction of dropping zenith angle are illustrated.

The first method is, on the basis of the data of all the cells, by assuming that the dropping amounts of the drop of water of each cell are normally distributed, to determine the vertex of simulated normal distribution curve as the distinctive dropping zenith angle ([A]).

The second method is, by plotting the numbers of the top three cells on the sides of an isosceles triangle, to determine the vertex of the isosceles triangle as the distinctive dropping zenith angle ([B]).

As illustrated in section [B] of FIG. 16C, by either of the two methods, a direction around 42 degree, with the vertex direction being 0 degrees, can be determined as the distinctive dropping zenith angle.

As described above, by determining the distinctive dropping azimuth direction and the distinctive dropping zenith angle, the distinctive dropping direction of the rainwater can be determined.

Here, in the above explanation of practical example, on the basis of an assumption such that each cell of the rain gauges of the first and the second practical examples is circumscribed with the virtual sphere, the amount of caught water per unit spherical area is calculated.

However, in actuality, a geometric correction (step S4) is necessary on a rainwater collision amount against the virtual sphere (bundles of the rainwater passing through the sphere) which is circumscribed with the catchment cells.

Figure 19:
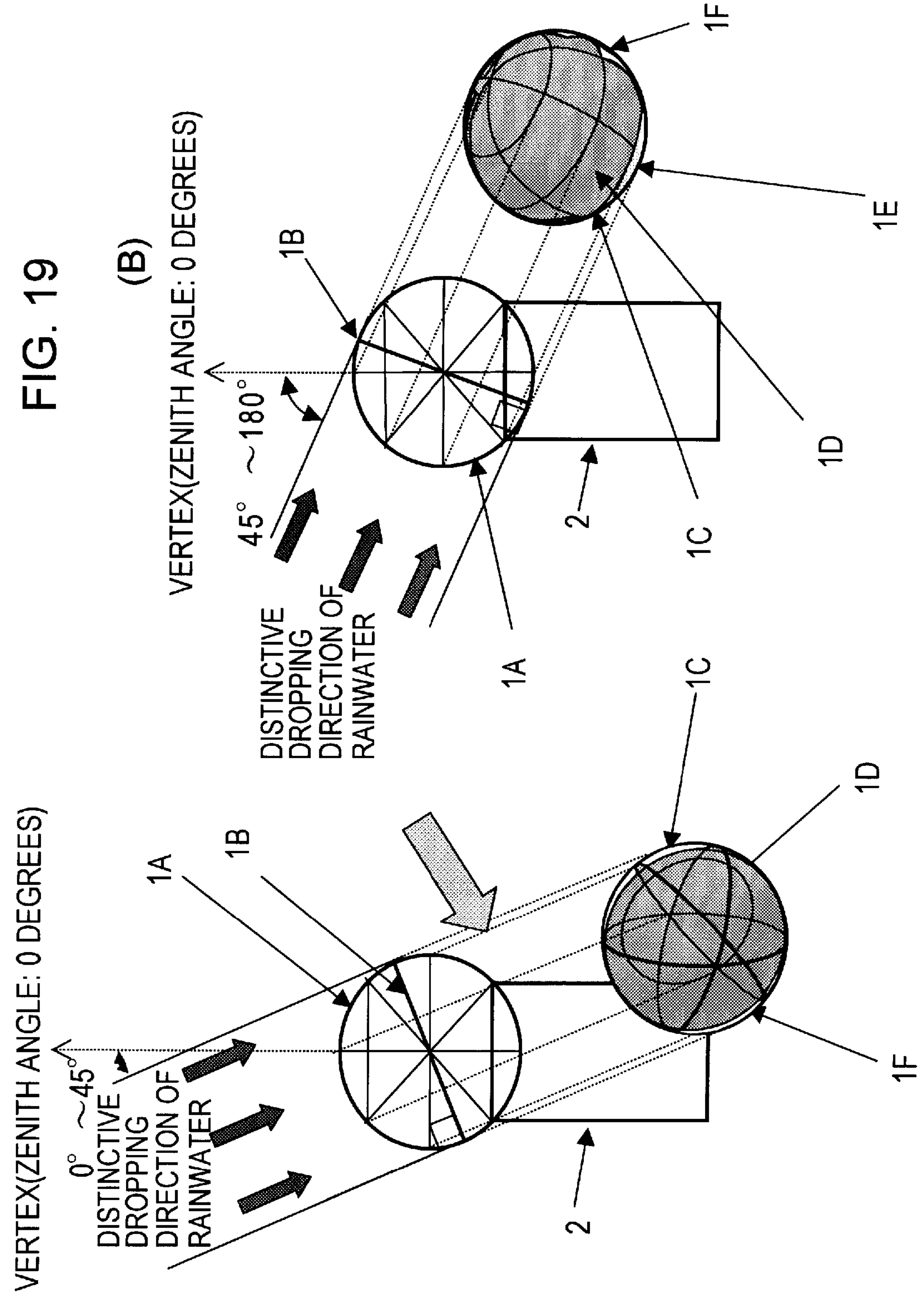
FIG. 19 is a drawing to explain a geometric correction, corresponding to step S4 of the processing flow in FIG. 15, on a rainwater collision amount against the virtual sphere (bundles of the rainwater passing through the sphere) which is circumscribed with the catchment cells, according to the distinctive dropping direction of the rainwater.

FIG. 19 is a drawing to explain such the geometric correction. FIG. 19 illustrates case [A] such that the distinctive dropping direction of the rainwater is within a range from the vertex of 0 degree to 45 degree, and case[B] of a range from 45 degree to 180 degree.

The catchment unit 1 is placed on the measurement unit 2. Therefore, against a virtual sphere 1A which is circumscribed with the catchment unit 1, a plane 1B which is vertical with the distinctive dropping direction of the rainwater is assumed. There occurs a difference between a projected region 1C to the plane 1B which is vertical to the distinctive dropping direction, and a region 1D which is capable of catching the rainwater.

That is, this difference occurs in the following two regions which are incapable of catching the rainwater.

For the first, a region at the lowermost of the virtual sphere 1A placed on the measurement unit 2, because of having no catchment cells, is a region 1E which is incapable of catching the rainwater, For the second, a region between the walls of the cells, because of being passed through by the rainwater coming into the virtual sphere 1A, is a region 1F which is incapable of catching the rainwater.

Such regions which are incapable of catching the rainwater depend on the dropping direction of the rainwater (the azimuth direction and the zenith angle). Therefore, correction values with respect to each direction (corresponding to rainwater catch ratio) can be preliminarily determined on an experimental basis and programmed. The correction values may depend on the rainfall intensity, the size of a drop of rainwater, and the wind velocity. Further, in the manufacturing process of the catchment unit 1, there may occur individual validities, therefore the pre-shipping examination is necessary.

In this way, at the step S4 of the processing flow of the above FIG. 15, a geometric correction by the preliminarily determined correction value is performed.

After that, at step S5 of FIG. 15, the rainwater collision amount is converted into a collision amount at the time the rain gauge is installed on an arbitrary installation plane (herewith the zenith angle of the horizontal plane is 0 degree), and further converted into a rainfall amount (the unit: mm) by the density of a rainwater (1g/$cm^3$). By this means, the rain gauge of the present invention can be applied for determining the rainwater collision amount per unit area of an inclined plane of any angle.

That is, the conventional rain gauge, because of being a horizontal 2-dimensional rain gauge, can be placed only on the horizontal plane. Contrary to this, the 3-dimensional rain gauge of the present invention, because of the spherical shape, can be placed on a plane of any azimuth direction and any zenith angle (including a vertical plane), and can measure the rainwater collision amount (the unit: g/$cm^2$) against any arbitrary inclined plane in the surroundings.

Figure 20A:
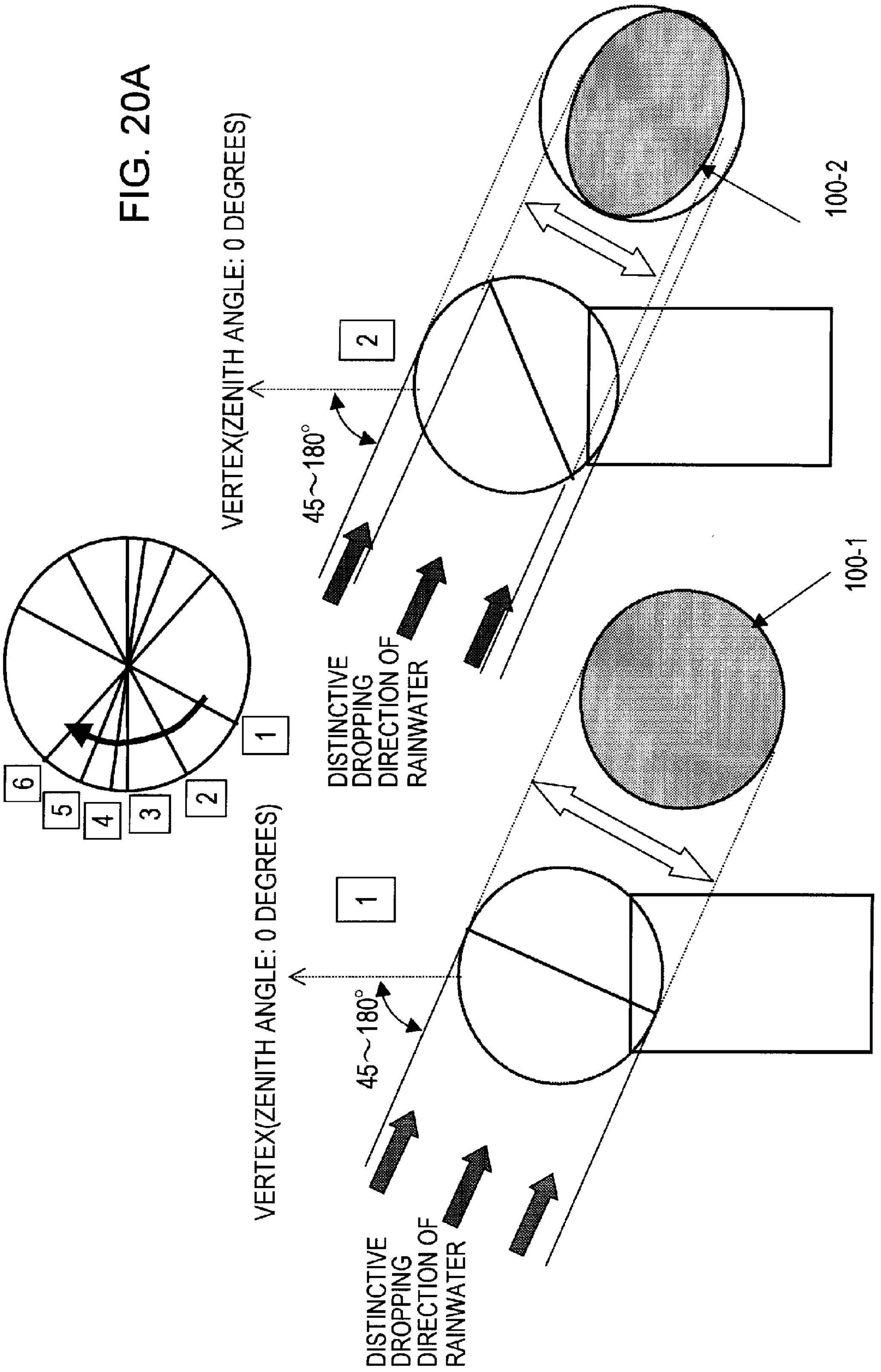
FIG. 20A is a drawing to illustrate the areas of the rainwater bundles at the zenith angle positions [1] and [2], corresponding to step S5 of the processing flow in FIG. 15.
Figure 20B:
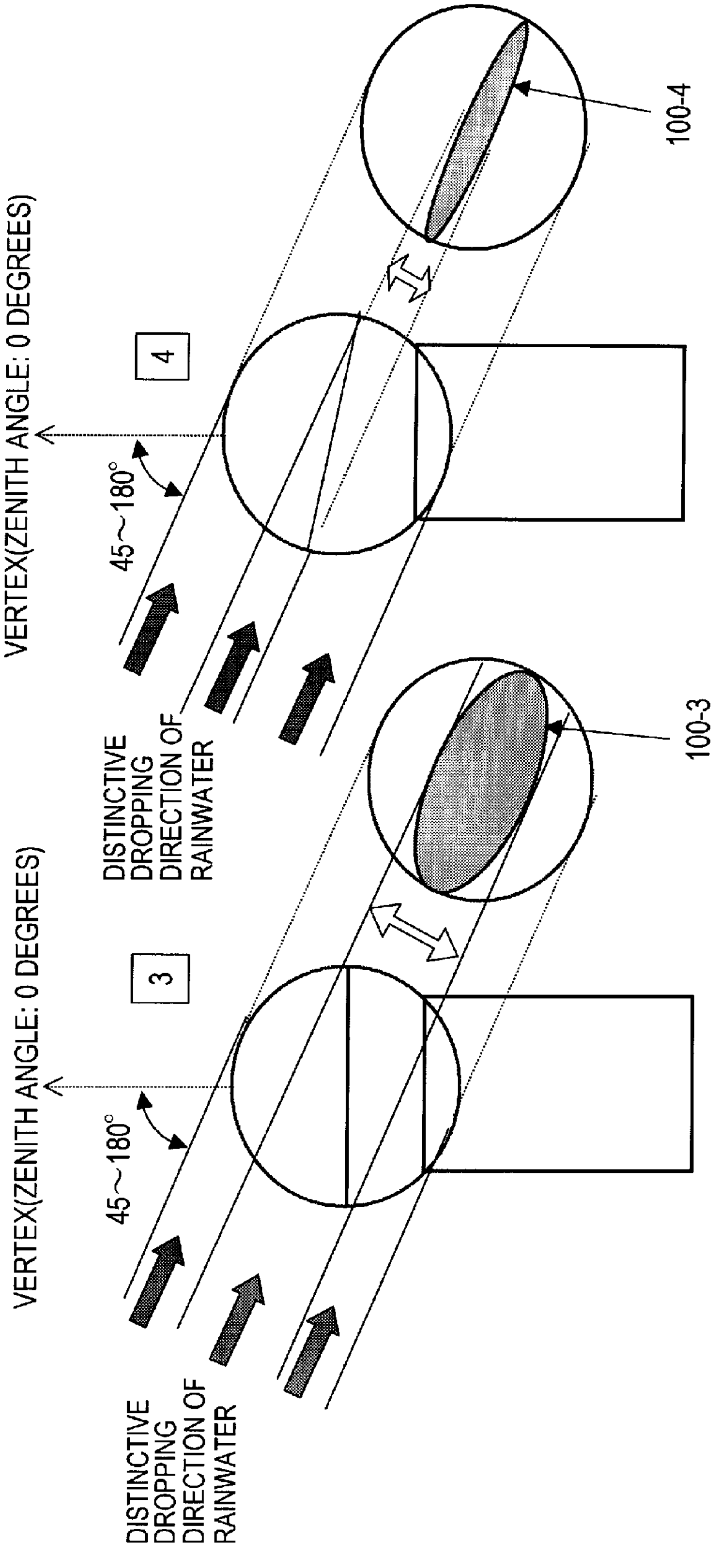
FIG. 20B is a drawing to illustrate the areas of the rainwater bundles at the zenith angle positions [3] and [4], corresponding to step S5 of the processing flow in FIG. 15.
Figure 20C:
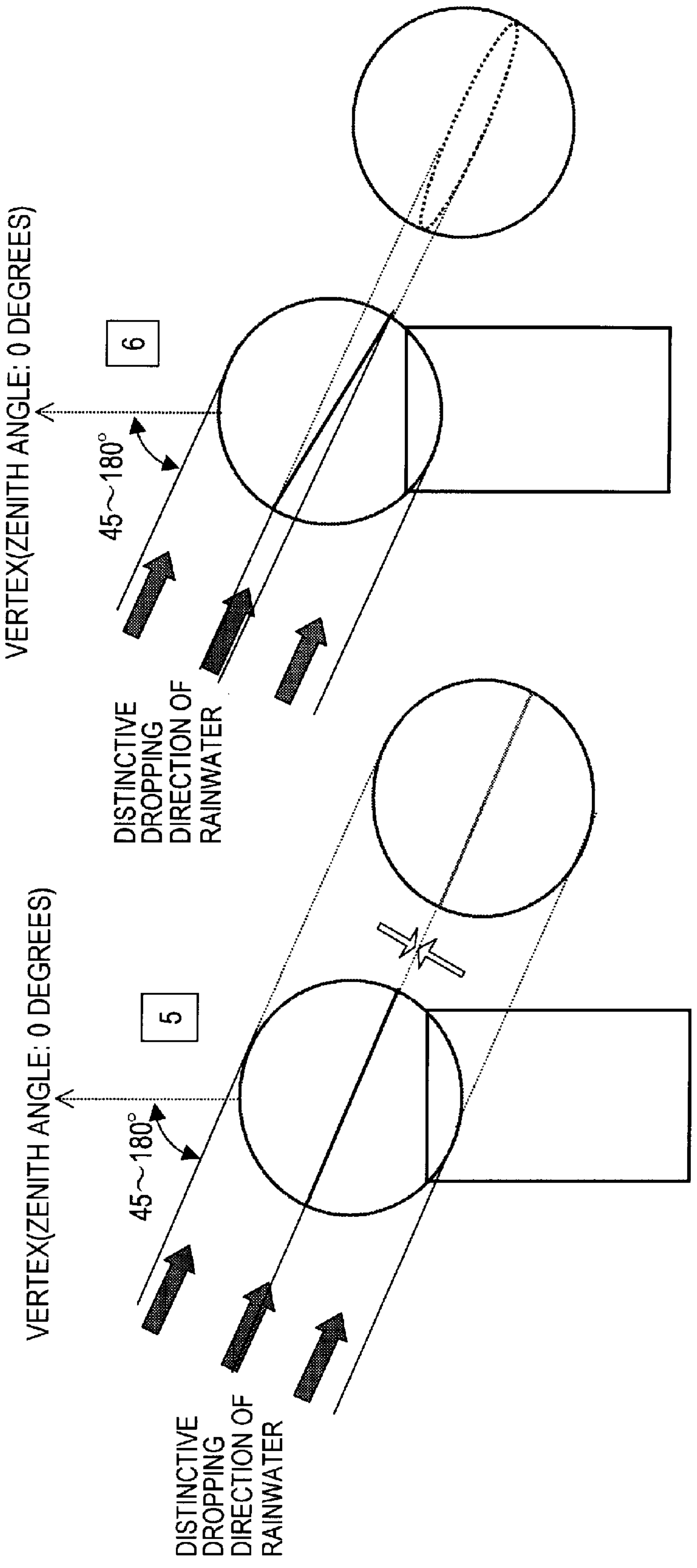
FIG. 20C is a drawing to illustrate the areas of the rainwater bundles at the zenith angle positions [5] and [6], corresponding to step S5 of the processing flow in FIG. 15.

FIGS. 20A, 20B, and 20C correspond to step S5 of the processing flow illustrated in FIG. 15, and illustrate changes of the area of the rainwater bundle when the zenith angle of a plane is rotated, with the zenith angle [1] illustrated in the upper region of FIG. 20A as a reference, to the positions of zenith angles of [2]-[6].

Concretely, FIG. 20A is a drawing to illustrate the areas of the rainwater bundles at the zenith angle positions [1] and [2]. FIG. 20B is a drawing to illustrate the areas of the rainwater bundles at the zenith angle positions [3] and [4]. FIG. 20C is a drawing, corresponding to step S5 of processing procedure flow of FIG. 15, to illustrate the areas of the rainwater bundles at the zenith angle positions [5] and [6].

In FIGS. 20A and 20B, if the azimuth direction of the plane is changed, the area of the rainwater bundle decreases in the orthogonal direction from the zenith angle (100-1–100-4). Further, in FIG. 20C, when the distinctive dropping direction of the rainwater is lateral with the inclined plane, (at the zenith angle position [5]), or when the distinctive dropping direction of the rainwater corresponds to the back side of the inclined plane, the area of the rainwater bundle vanishes and thus the rainwater collision amount becomes zero.

From the above, it is understood that the amount of rainwater which collides on the plane greatly differs depending on the relation between the distinctive dropping direction of the rainwater and the direction of the plane, with the maximum collision amount on the vertical plane, zero collision amount on the parallel plane, and zero collision amount on the plane exceeding parallel position, corresponding to the back side of the plane.

Therefore, at step S5 of FIG. 15, by converting the dropping amount of the rainwater into the dropping amount on the plane on which the rain gauge placed at the time of the installation, the rainwater collision amount on the installation plane can be easily detected.

Here, the advantage of the rain gauge in accordance with the present invention over the conventional rain gauge with a tipping bucket in measurement accuracy will be examined on the basis of observation data as follows.

Figure 21:
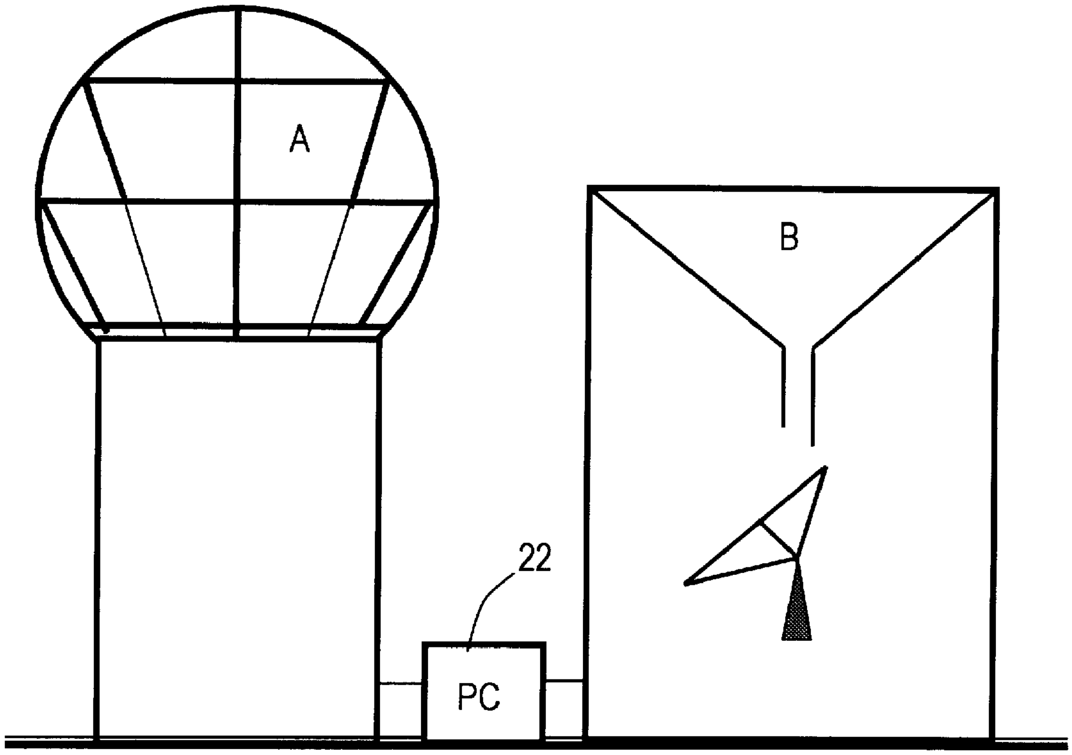
FIG. 21 is a schematic drawing of an apparatus used for an examination of the advantage of the rain gauge in accordance with the present invention over the conventional rain gauge with a tipping bucket in measurement accuracy.

FIG. 21 is a schematic drawing of an apparatus used for such an examination.

In FIG. 21, a component A is an omnidirectional rain gauge in accordance with the present invention, and a component B is a conventional rain gauge with tipping bucket. The omnidirectional rain gauge in accordance with the present invention (arbitrarily referred to as a "3-dimensional rain gauge" hereinafter), the component A, and the conventional rain gauge with a tipping bucket (arbitrarily referred to as a "1-dimensional rain gauge" hereinafter), the component B are placed in a lateral fashion on the same ground.

And the measured values of the 3-dimensional rain gauge (the component A) and the 1-dimensional rain gauge (the component B) are obtained by a data logger 22.

Figure 22A:
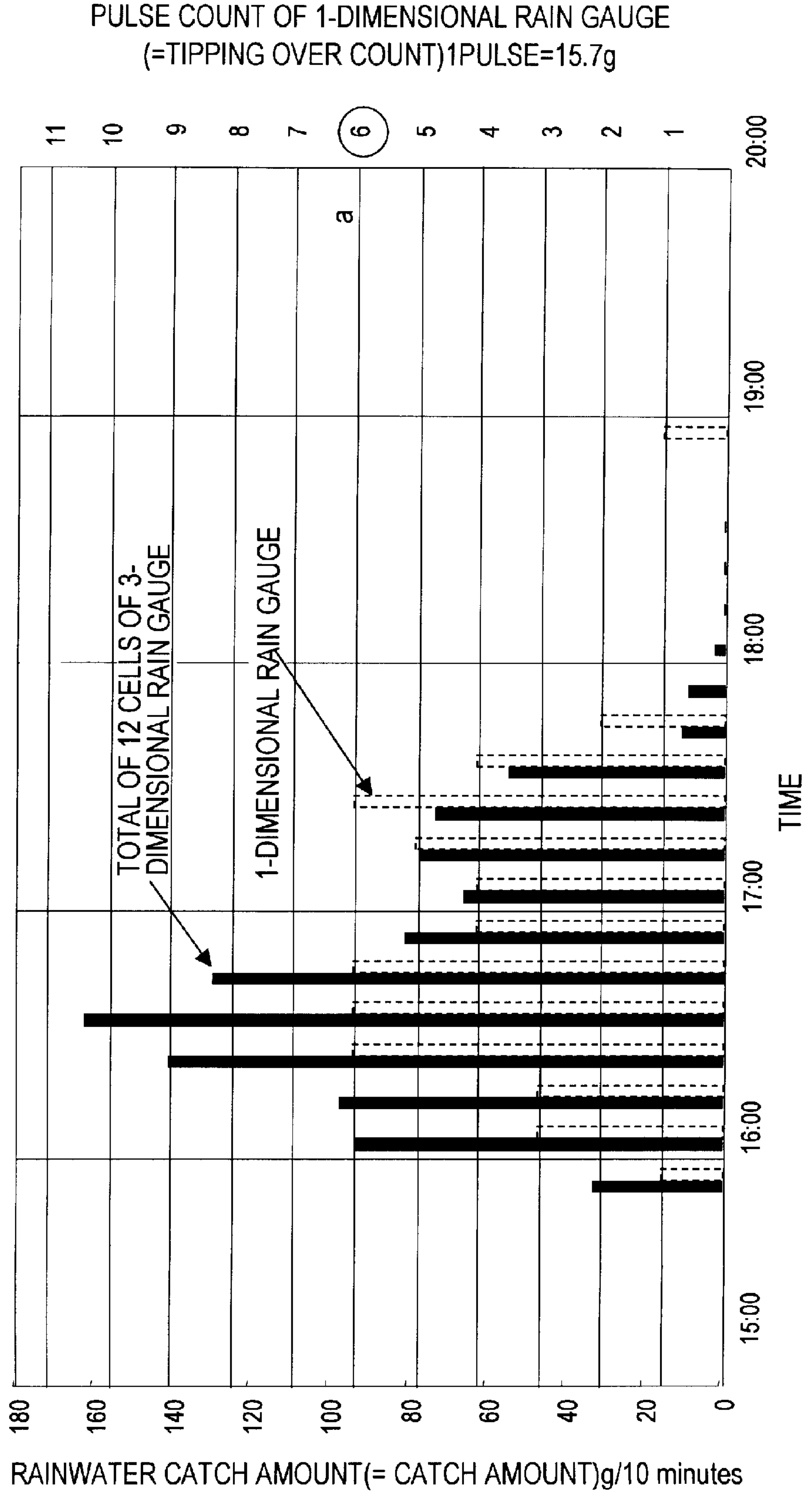
FIG. 22A is a graphic representation of measurement results in equal intervals, which provided the base of the 10 minute measurement data explained previously in FIG. 10A, obtained by the examination apparatus of FIG. 21 which measures the rainfall amount every 10 minutes over hours.
Figure 22B:
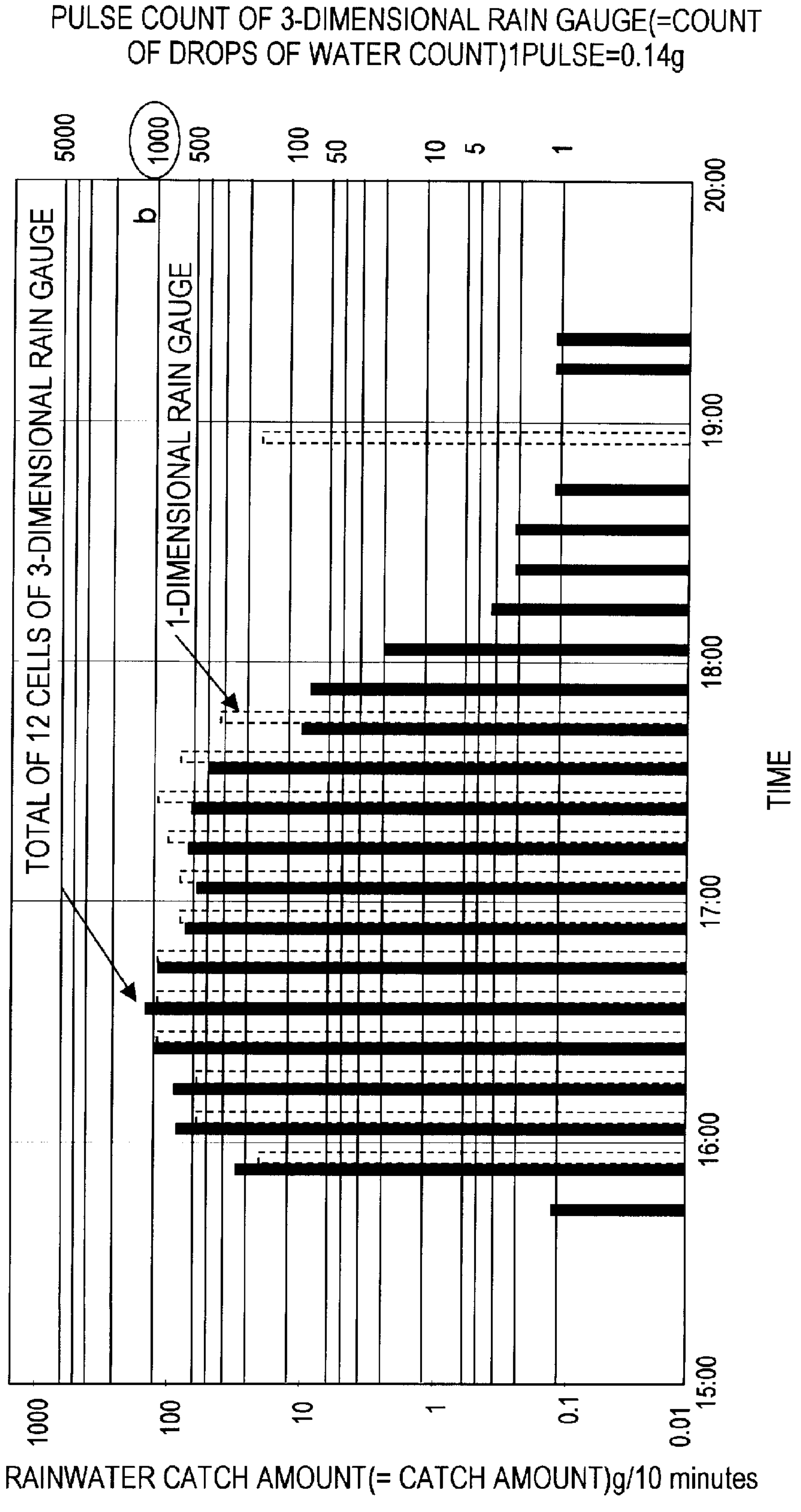
FIG. 22B is a graphic representation of measurement results in a logarithm scale, which provided the base of the 10 minute measurement data explained previously in FIG. 10A, obtained by the examination apparatus of FIG. 21 which measures the rainfall amount every 10 minutes over hours.

FIGS. 22A and 22B are graphic representations of measurement results, which provided the base of the 10 minute measurement data explained previously in FIG. 10A, obtained by the examination apparatus of FIG. 21 which measures the rainfall amount every 10 minutes over hours. FIG. 22A has a vertical axis in equal intervals, and FIG. 22B has a vertical axis in a logarithm scale.

The 3-dimensional rain gauge (the component A) measures the rainfall amount by aggregating the numbers of conduction of the switches (the number of pulses) of all channels in every 10 minutes, and multiplying the total by the weight of a drop of water per pulse, 0.14 g, so that the rainwater catchment amount (equivalent to the catching amount) in the unit of g/10 minutes is obtained.

On the other hand, the examined 1-dimensional rain gauge (the component B) generates a pulse per one tipping over of the tipping bucket which has a capacity of 15.7 g. Therefore, catching amount in every 10 minutes is determined by multiplying the number of pulses in the interval by the tipping bucket's capacity of 15.7 g, so that the rainwater catchment amount (equivalent to the catching amount) in the unit of g/10 minutes is obtained.

As clearly understood from FIGS. 22A and 22B, the 1-dimensional rain gauge (the component B) tips over no more than the maximum number of 6 times/10 minutes (FIG. 22A: a), on the other hand, the 3-dimensional rain gauge in accordance with the present invention counts more drops of water than 1000 drops/10 minutes in total (FIG. 22B:b).

Here, rainfall time zones in and detected times at which the rain gauges perform the detection will be compared. As illustrated in FIG. 22B, the time zone of the detection of the 3-dimensional rain gauge (the component A) is from 15:40 to 20:30, that is, 210 minutes in total, on the other hand, the time zone of the detection of the 1-dimensional rain gauge (the component B) is from 15:50 to 19:00, that is, 130 minutes in total. Therefore, it is understood that the 1-dimensional rain gauge was able to perform the detection only as long as 62% of the time period in which the 3-dimensional rain gauge performed the detection.

To compare the total amounts of rainfall in one consecutive rainfall, the 3-dimensional rain gauge's catching amount is 1036.2 g, while the 1-dimensional rain gauge's catching amount is 800.7 g. Therefore, it is determined that the 1-dimensional rain gauge was able to catch only as much as 77% (=800.7/1036.72) of the rainwater amount caught by the 3-dimensional rain gauge. The reason for this is because the 1-dimensional rain gauge has difficulties in catching the rainwater coming from the diagonal angles.

Further, the wind velocity of the rainfall time zone from 15:40 to 20:30, in which the rain gauges performed the detection, is from the minimum of 1.4 m/s to the maximum of 2.4 m/s, with the average of 1.4 m/s. Such condition of wind velocity belongs to a weak wind, therefore, under conditions with stronger wind, the catching amount of rainwater by the 1-dimensional rain gauge in the comparison above is anticipated to be in smaller numbers.

Also, in FIGS. 22A and 22B, the reason for the measured values by the 1-dimensional rain gauge indicating the greater number than the measured values by the 3-dimensional rain gauge, or the reason for the measured values by the 1-dimensional rain gauge indicating one time measured value after a series of zeros is because under a condition of a little rainfall, it takes a certain long time before the rainwater of 15.7 g is retained in the tipping bucket enough for the tipping over.

As explained above about the practical examples, the present invention enables, contrary to the conventional rain gauge, the catch ratio of nearly 100% for catching the incoming rainwater. And by performing the geometric correction as illustrated in step S4 of FIG. 15, the catch ratio of 100% is possible. And the measurement accuracy, which depends on the weight of drops of water (0.14 g) passing through the electrode terminals of the switch and the consistency thereof, can be as much as 100 times of the tipping over unit (0.5 mm or 15.7 g) of the conventional rain gauge with tipping bucket.

Further, the present invention enables catching and measuring the rainfall with respect to each direction, and thus converting it into the rainwater collision amount on the plane with an arbitrary inclination. Therefore, the present invention greatly contributes to the industry, the disaster prevention, and the environmental preservation.

What is claimed is:

1. An omnidirectional rain gauge comprising:

a catchment unit to catch rainwater; and a measurement unit to measure the amount of the rainwater caught by the catchment unit; wherein the catchment unit comprises a plurality of catchment cells, of which outer rims shape a virtual sphere, and which are arranged in horizontal azimuth directions and zenith direction; and the measurement unit, by dropping in a drop of water of a certain weight the rainwater caught by each of the plurality of catchment cells, detects the number of the dropping drops of water with respect to each of the plurality of catchment cells, and determines the amount of the rainwater caught by each of the plurality of catchment cells on the basis of the total detected number of the drops of water.

2. The omnidirectional rain gauge according to claim 1, wherein the catchment unit comprises:

a plurality of conical cylinders which have individually different heights, and are overlaid so that bottom vertexes of the plurality of conical cylinders stand in a vertical straight line passing through the center of the virtual sphere;

the overlaid plurality of conical cylinders are partitioned by partitions, which are arranged radially in a plurality of horizontal azimuth directions, to form a plurality of catchment cells;

each of the plurality of partitions is shaped as semicircle following a virtual spherical outer circumference; and the diameter of each of top opening parts, which are opposite to the bottom vertexes, of the overlaid plurality of conical cylinders is sized to follow the virtual spherical outer circumference.

3. The omnidirectional rain gauge according to claim 2, further comprising:

a second catchment unit for catching the drops of water which pass through each of the plurality of cells; and a processor unit which aggregates the amount of the drop of water caught by the second catchment unit, and determines, when there is a difference between the aggregated amount of the drop of water and total amount of rainwater caught by each of the plurality of catchment cells, that the difference is the amount of rainwater caught by a catchment cell which does not detect the amount of the drops of water.

4. The omnidirectional rain gauge according to claim 2, wherein the measurement unit comprises:

a plurality of tubes of the same diameter, each of which is connected to the inside of water pipes provided at each of the bottoms of the plurality of catchment cells;

a switch unit which has a plurality of switches each of which is provided corresponding to each of the plurality of tubes; and detects drops of water which drop from the bottom tip portion of each of the plurality of tubes; and a processing unit which counts the number of the drops of water detected by the switch unit and converts the number into the amount of rainwater caught by each of the plurality of catchment cells.

5. The omnidirectional rain gauge according to claim 4, wherein each of the plurality of switches of the switch unit comprises a pair of electrode plates facing each other placed, with respect to each of the plurality of tubes, in the position apart by a prescribed distance from the bottom tip portions of the plurality of tubes; and the pair of electrode plates becomes conducted when a drop of water dropping from the bottom tip portion of the tube corresponding to the pair of the electrode plates, passes between the pair of electrode plates facing each other.

6. The omnidirectional rain gauge according to claim 5, wherein the pair of electrode plates facing each other is placed so that the electrode plates are parallel in the direction of dropping of the drops of water.

7. The omnidirectional rain gauge according to claim 5, wherein the pair of electrode plates facing each other is placed so that the electrode plates are arranged vertically along the direction of dropping of the drops of water and are in contact with one of drops of water simultaneously.

8. The omnidirectional rain gauge according to claim 1, wherein the catchment unit comprises a plurality of funnels which have tubes of individually different diameters at the bottom parts, and are overlaid so that the tubes are inserted into one another in the order of the diameters;

the plurality of overlaid funnels are partitioned by a plurality of partitions, which are radially arranged in a plurality of horizontal azimuth directions, to form a plurality of catchment cells;

each of the plurality of partitions is shaped as semicircle following a virtual spherical outer circumference; and the diameters of the upper openings of the plurality of overlaid funnels are sized to follow the virtual spherical outer circumference.

9. A method for determining a predominant dropping direction of rainwater, by using a rain gauge comprising a catchment unit to catch rainwater and a measurement unit to measure the amount of the rainwater caught by the catchment unit, wherein the catchment unit comprises a plurality of catchment cells, of which outer rims shape a virtual sphere, and which are arranged in horizontal azimuth directions and zenith direction, the method comprising:

by the measurement unit, setting a unit period for measuring a rainfall amount;

counting the number of rainwater drops with respect to each of the plurality of catchment cells of the catchment unit in the set unit period;

determining the amount of the rainwater by multiplying the number of rainwater drops by a prescribed weight of a drop of the rainwater;

determining the predominant dropping direction, in an azimuth direction and in a zenith angle, of the rainwater on the basis of a quantitative relation of rain water drops of each of the plurality of the catchment cells;

geometrically correcting the predominant dropping direction to a rainwater collision amount against a virtual sphere which is circumscribed with the plurality of the catchment cells;

converting the rainwater collision amount into a collision amount of the rainwater against a plane at the time of installation of the rain gauge to the plane; and further dividing the collision amount of the rainwater against the plane by a density of the rainwater to obtain the rainfall amount.

10. The method for determining a predominant dropping direction of rainwater, according to claim 9, wherein the catchment unit comprises a plurality of conical cylinders which have individually different heights, and are overlaid so that bottom vertexes of the plurality of conical cylinders stand in a vertical straight line passing through the center of the virtual sphere;

the overlaid plurality of conical cylinders are partitioned by partitions, which are arranged radially in a plurality of horizontal azimuth directions, to form a plurality of catchment cells;

each of the plurality of partitions is shaped as semicircle following a virtual spherical outer circumference; and the diameter of each of top opening parts, which are opposite to the bottom vertexes, of the overlaid plurality of conical cylinders is sized to follow the virtual spherical outer circumference.

11. The method for determining a predominant dropping direction of rainwater according to claim 9, wherein the catchment unit comprises a plurality of funnels which have tubes of individually different diameters at the bottom parts, and are overlaid so that the tubes are inserted into one another in the order of the diameters;

the plurality of overlaid funnels are partitioned by a plurality of partitions, which are radially arranged in a plurality of horizontal azimuth directions, to form a plurality of catchment cells;

each of the plurality of partitions is shaped as semicircle following a virtual spherical outer circumference; and the diameters of the upper openings of the plurality of overlaid funnels are sized to follow the virtual spherical outer circumference.

12. The omnidirectional rain gauge according to claim 8, further comprising:

a second catchment unit for catching the drops of water which pass through each of the plurality of cells; and a processor unit which aggregates the amount of the drop of water caught by the second catchment unit, and determines, when there is a difference between the aggregated amount of the drop of water and total amount of rainwater caught by each of the plurality of catchment cells, that the difference is the amount of rainwater caught by a catchment cell which does not detect the amount of the drops of water.

13. The omnidirectional rain gauge according to claim 8, wherein the measurement unit comprises:

a plurality of tubes of the same diameter, each of which is connected to the inside of water pipes provided at each of the bottoms of the plurality of catchment cells;

a switch unit which has a plurality of switches each of which is provided corresponding to each of the plurality of tubes; and detects drops of water which drop from the bottom tip portion of each of the plurality of tubes; and a processing unit which counts the number of the drops of water detected by the switch unit and converts the number into the amount of rainwater caught by each of the plurality of catchment cells.

14. The omnidirectional rain gauge according to claim 13, wherein each of the plurality of switches of the switch unit comprises a pair of electrode plates facing each other placed, with respect to each of the plurality of tubes, in the position apart by a prescribed distance from the bottom tip portions of the plurality of tubes; and the pair of electrode plates becomes conducted when a drop of water dropping from the bottom tip portion of the tube corresponding to the pair of the electrode plates, passes between the pair of electrode plates facing each other.

15. The omnidirectional rain gauge according to claim 14, wherein the pair of electrode plates facing each other is placed so that the electrode plates are parallel in the direction of dropping of the drops of water.

16. The omnidirectional rain gauge according to claim 14, wherein the pair of electrode plates facing each other is placed so that the electrode plates are arranged vertically along the direction of dropping of the drops of water and are in contact with one of drops of water simultaneously.

* * * * *